(12) United States Patent
Eliason

(10) Patent No.: US 11,999,508 B2
(45) Date of Patent: Jun. 4, 2024

(54) AIRPLANE PASSENGER TRANSPORT SYSTEM

(71) Applicant: Roy Eliason, South Haven, MN (US)

(72) Inventor: Roy Eliason, South Haven, MN (US)

(*) Notice: Subject to any disclaimer, the term of this patent is extended or adjusted under 35 U.S.C. 154(b) by 63 days.

(21) Appl. No.: 17/830,807

(22) Filed: Jun. 2, 2022

(65) Prior Publication Data

US 2022/0306321 A1    Sep. 29, 2022

Related U.S. Application Data

(63) Continuation-in-part of application No. 17/147,790, filed on Jan. 13, 2021, now abandoned.

(60) Provisional application No. 63/302,749, filed on Jan. 25, 2022, provisional application No. 63/276,987, filed on Nov. 8, 2021, provisional application No. 63/221,119, filed on Jul. 13, 2021, provisional application No. 63/210,587, filed on Jun. 15, 2021, provisional application No. 63/066,342, filed on Aug. 17, 2020, provisional application No. 63/025,195, filed on May 15, 2020.

(51) Int. Cl.
*B64F 1/31* (2006.01)

(52) U.S. Cl.
CPC .................. *B64F 1/31* (2013.01)

(58) Field of Classification Search
CPC ...... B64F 1/31; B64D 11/00; B64D 2011/004
See application file for complete search history.

(56) References Cited

U.S. PATENT DOCUMENTS

| | | | |
|---|---|---|---|
| 4,543,027 A | 9/1985 | Jones | |
| 5,090,639 A | 2/1992 | Miller | |
| 7,344,109 B1* | 3/2008 | Rezai | B64D 11/00 244/118.6 |
| 2005/0247824 A1* | 11/2005 | Allison, Sr. | B64F 1/31 244/137.2 |
| 2008/0217475 A1* | 9/2008 | Allison | B64D 11/00 244/103 S |
| 2018/0194469 A1 | 7/2018 | Evans | |
| 2018/0273180 A1* | 9/2018 | Wietzke | B64D 11/003 |
| 2020/0398730 A1 | 12/2020 | Glatfelter | |
| 2020/0398731 A1* | 12/2020 | Glatfelter | B64C 37/00 |
| 2020/0398732 A1 | 12/2020 | Glatfelter | |

(Continued)

FOREIGN PATENT DOCUMENTS

| | | |
|---|---|---|
| DE | 7729718 U1 | 1/1980 |
| GB | 26774 A | 12/1909 |
| GB | 559763 A | 3/1944 |

(Continued)

OTHER PUBLICATIONS

Documentary: Antonov AN-225—The World's Largest Aircraft. URL: https://www.youtube.com/watch?v=6sggQqdvqHs&t=236s, 2 pgs.

*Primary Examiner* — Timothy D Collins
*Assistant Examiner* — Justin Michael Heston
(74) *Attorney, Agent, or Firm* — Spencer Fane, LLP

(57) ABSTRACT

An airplane passenger transport system that includes an airplane and a first passenger module. The first passenger module is removably positionable in the airplane. The first passenger module is adapted to transport at least one person in an at least partially enclosed configuration. The first passenger module includes at least one of a seat and a bed for the at least one person can sit while being transported in the airplane.

21 Claims, 28 Drawing Sheets

(56) References Cited

U.S. PATENT DOCUMENTS

2020/0400437 A1    12/2020    Glatfelter

FOREIGN PATENT DOCUMENTS

| KR | 1020180045111 A | 5/2018 |
|---|---|---|
| RU | 2132802 C1 | 7/1999 |
| RU | 2641567 C1 | 1/2018 |
| RU | 2693398 C1 | 7/2019 |

* cited by examiner

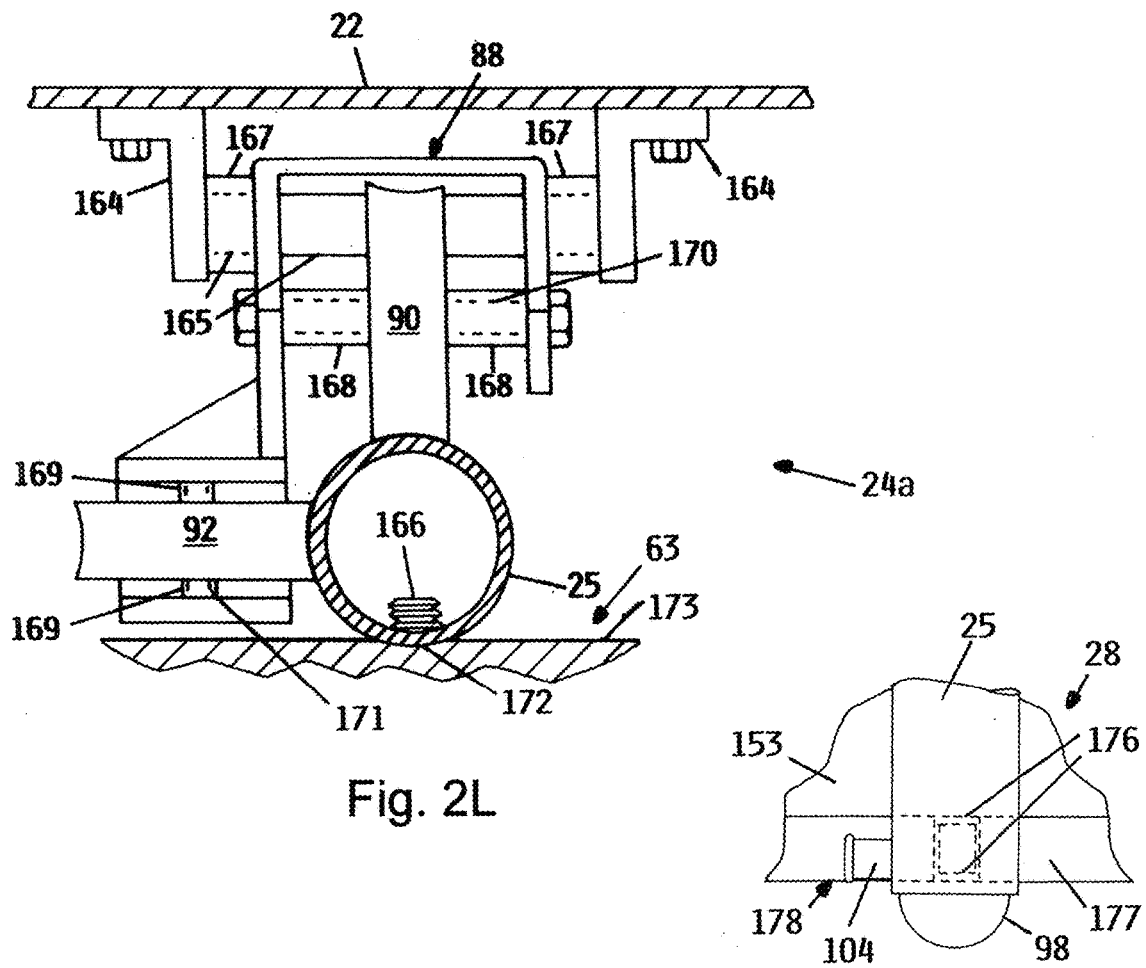
Fig. 2L
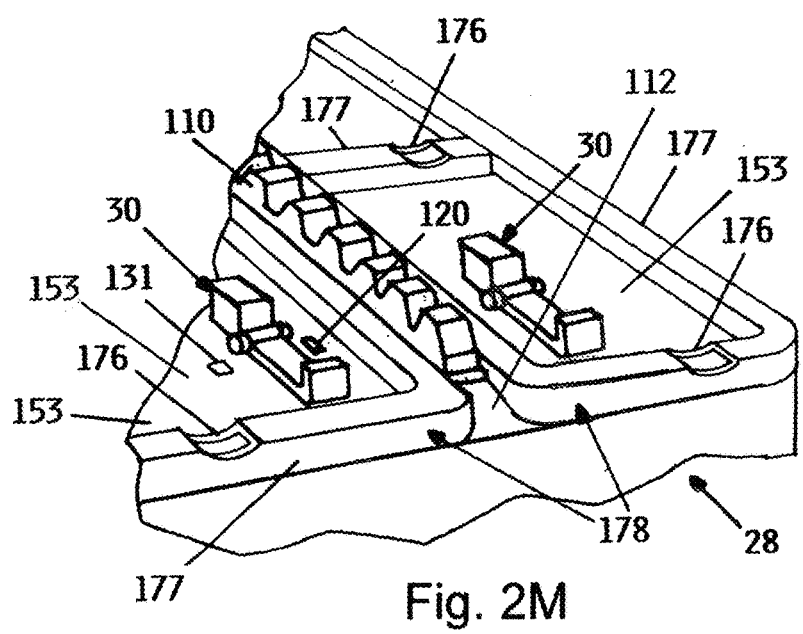
Fig. 2N
Fig. 2M

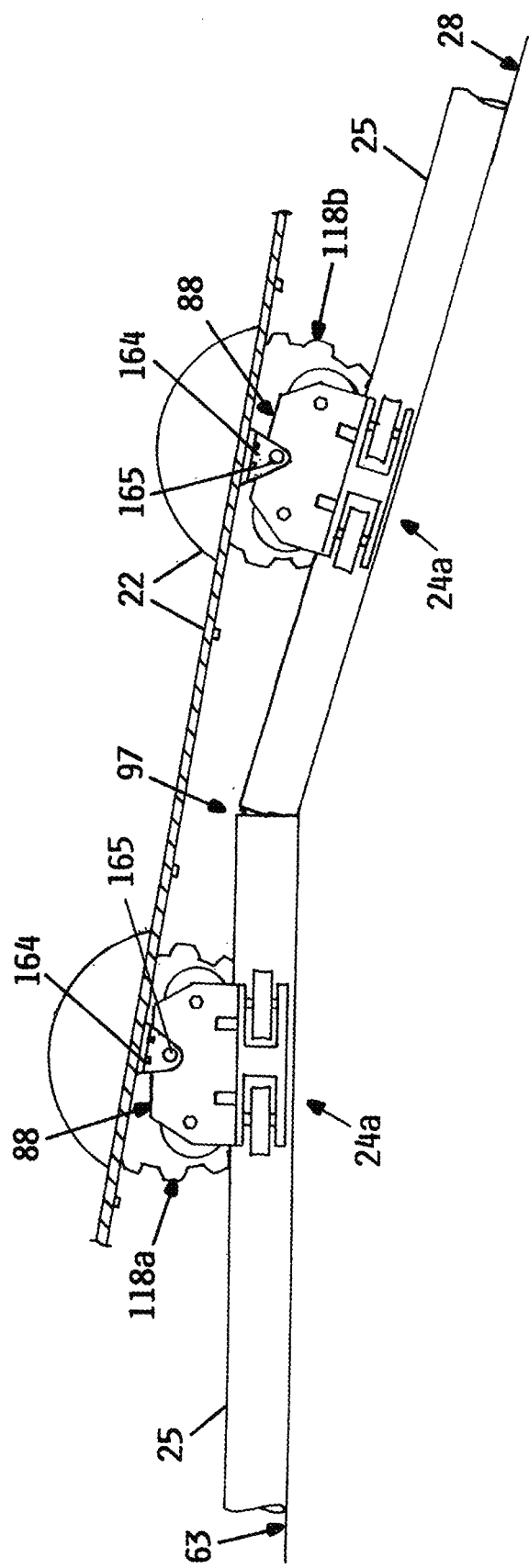

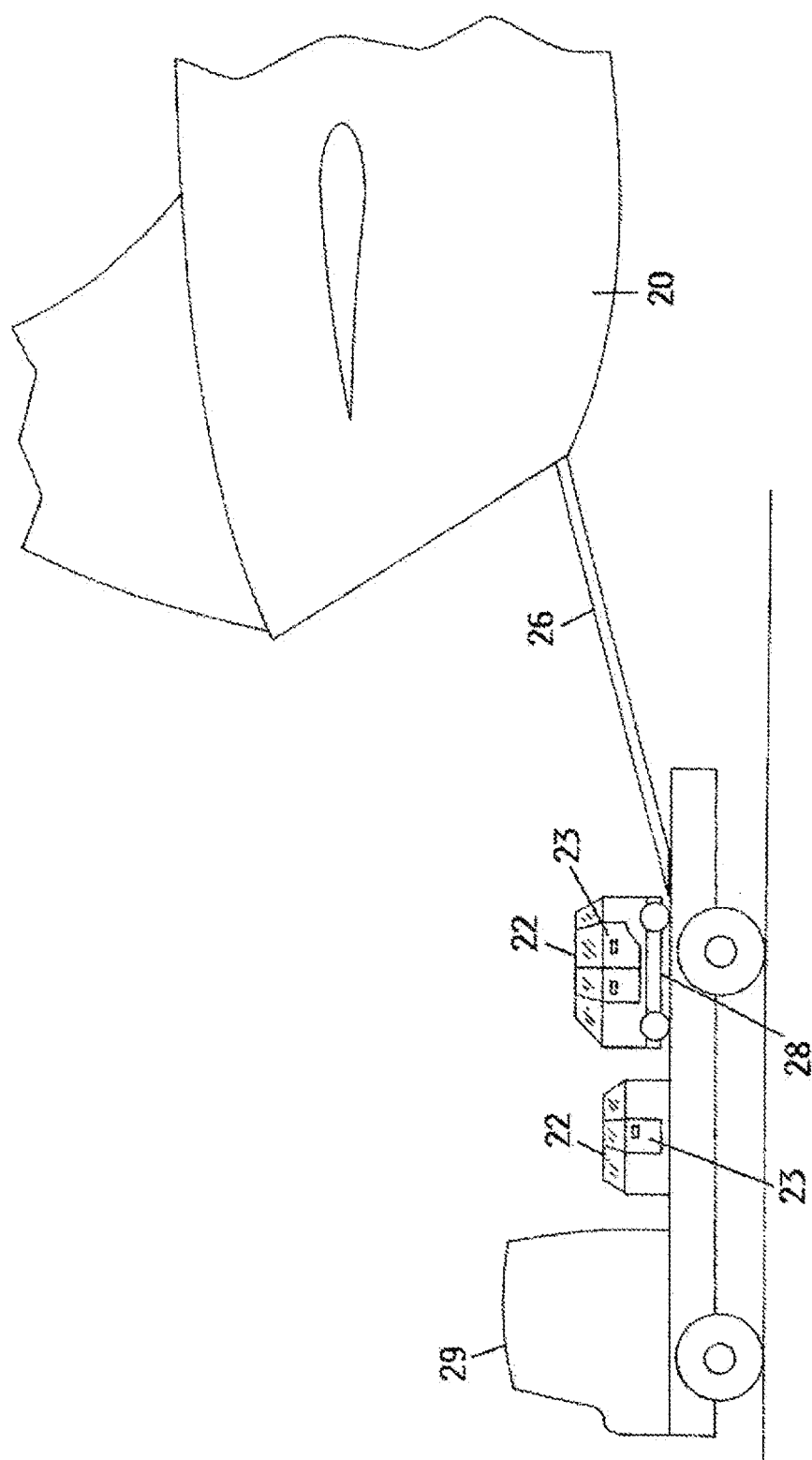

AIRPLANE PASSENGER TRANSPORT SYSTEM

REFERENCE TO RELATED APPLICATION

This application is a continuation-in-part of U.S. application Ser. No. 17/147,790, which was filed on Jan. 13, 2021, which claims priority to Provisional Applic. No. 63/025,195, filed on May 15, 2020, and Provisional Applic. No. 63/066,342, filed on Aug. 17, 2020, the contents of which are incorporated herein by reference. This application claims priority to U.S. Application No. 63/210,587, which was filed on Jun. 15, 2021; U.S. Application No. 63/221,119, which was filed on Jul. 13, 2021; U.S. Application No. 63/276,987, which was filed on Nov. 8, 2021; and U.S. Application No. 63/302,749, which was filed on Jan. 25, 2022.

FIELD OF THE INVENTION

The invention generally relates to systems for transporting passengers. More particularly, the invention relates to an airplane passenger transport system.

BACKGROUND OF THE INVENTION

While airplanes provide a mechanism for persons to more quickly travel between locations than ground-based travel, there are significant inefficiencies associated with conventional techniques in which passengers individually load and unload the passenger airplanes.

SUMMARY OF THE INVENTION

Any embodiment of the invention is directed to an airplane passenger transport system that includes a plurality of passenger modules and an airplane. The airplane passenger transport system enables the passengers to more quickly be loaded and unloaded on the airplane.

Another embodiment of the invention is directed to an airplane passenger transport system that includes an airplane and a first passenger module. The first passenger module is removably positionable in the airplane. The first passenger module is adapted to transport at least one person in an at least partially enclosed configuration. The first passenger module includes at least one of a seat and a bed for the at least one person can sit while being transported in the airplane.

Another embodiment of the invention is directed to a method of transporting passengers in an airplane. A first passenger module is provided that includes at least one of a seat and a bed for the at least one person can sit while being transported in the airplane. A second passenger module is provided that includes at least one of a seat and a bed for the at least one person can sit while being transported in the airplane. A first person is positioned at least partially inside the first passenger module. A second person is positioned at least partially inside the second passenger module. The first passenger module is moved to a position inside an airplane. The second passenger module is moved to a position inside the airplane. The airplane is flown to a different location than a location when the first person was positioned at least partially inside the first passenger module.

Another embodiment of the invention is directed to a method of reducing time for passengers to board an airplane as compared to the passengers individually boarding the airplane. A passenger module is provided that includes at least one of a seat and a bed for the at least one person can sit while being transported in the airplane. At least one person is positioned at least partially inside the first passenger module. The first passenger module is moved to a position inside an airplane. The airplane is flown to a different location than a location at which the at least one person was positioned at least partially inside the first passenger module.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 2A-1 is a perspective view of an alternative mechanism for moving passenger modules from a transport module to the airplane.

FIG. 2A-2 is a perspective view of an alternative mechanism for moving passenger modules from a transport module to the airplane.

FIG. 2L is an enlarged cross-section view illustrating relationship between the passenger module, the wheel assembly and the rail.

FIG. 2M is a perspective view of an alternative mechanism for securing the rail on the power wheeled base.

FIG. 2N is a partial top view of the support structure on the power wheeled base.

FIG. 2O is a schematic view illustrating the position and travel path of the passenger module along the rail.

FIG. 3 is a side view illustrating passenger modules being loaded onto an airplane from a transport vehicle.

FIG. 10 is a sectional view of the passenger module taken along a line 10-10 in

FIG. 9.

DETAILED DESCRIPTION OF THE INVENTION

Figure 1:
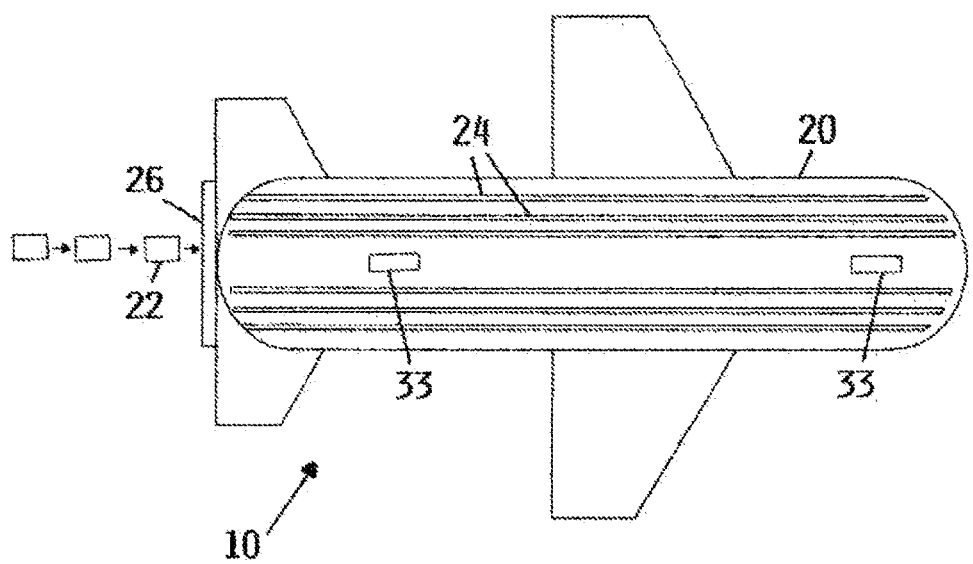
FIG. 1 is a top view of an airplane passenger transport system according to an embodiment of the invention that includes a plurality of passenger modules and an airplane.

The invention is directed to an airplane passenger transport system as illustrated at 10 in FIG. 1. The airplane passenger transport system 10 generally includes an airplane 20 and a plurality of passenger modules 22.

Each passenger module 22 is adapted to receive at least one person. In addition to the person, the passenger module 22 may also receive the person's luggage and potentially also other items that the person travels with such as pets.

Figure 18:
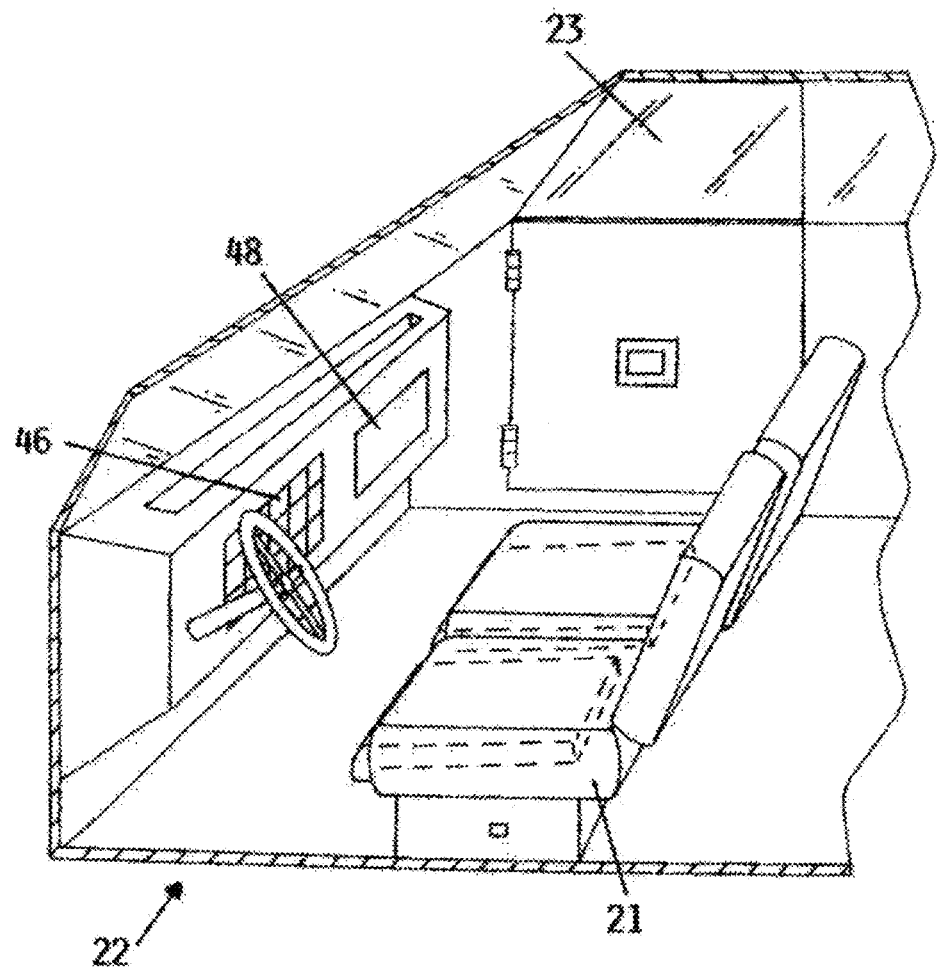
FIG. 18 is a partially broken away perspective view of the passenger module to illustrate components inside the passenger module.

The passenger module 22 includes a seat 21 for each person, as illustrated in FIG. 18. The seat 21 may assume a variety of forms using the concepts of the invention ranging from a basic upright chair to a chair that at least partially reclines. It is also possible for the seat 21 to fully recline into a bed. Alternatively or additionally, a bed that is separate from the seat 21 may be provided in the passenger module 22.

The passenger module 22 will include safety features that are commonly found on conventional passenger airplanes such as a seat belt to retain the passenger in the seat 21. The passenger modules 22 may also include a breathing system 48 similar to conventional passenger airplanes. Alternatively to putting the breathing system 48 in the passenger modules 22, the breathing system 48 may be provided in the airplane 20 and be readily accessible to the persons in each of the passenger modules 22.

The passenger modules 22 may also include informational displays 46 such as to inform persons when seat belt use is required. The passenger modules 22 may further include entertainment systems and/or power outlets. Such entertainment systems may be independent from the airplane 20 or may be connected to the airplane 20. This embodiment may also include bathroom(s) and/or refreshment area(s) 33 that are similar to a conventional passenger transport airplane.

The passenger modules 22 may be formed in a variety of sizes that are similar to the different classes on a conventional airplane ranging from economy to premium economy to business class and first class. The passenger modules 22 may also be sized to accommodate a larger number of persons such as 10-50 persons.

The passenger module 22 may be at least partially enclosed. For example, the passenger modules 22 may include at least one side wall and a top wall. In situations where the passenger module 22 is at least partially enclosed, the passenger module 22 may include an opening through which the person can move into and out of the passenger module 22. This opening may be at least partially covered with a door 23. However, it is not necessary for the passenger module 22 to be enclosed for the airplane passenger transport system 10 to provide the benefits set forth herein.

The passenger module 22 may be fabricated from a variety of materials using the concepts of the invention. In certain embodiments, the passenger module 22 is fabricated from lightweight materials. In addition or as an alternate to charging per passenger as is done on conventional passenger airplanes, the airplanes may charge based upon the weight and/or volume of the passenger module 22.

In situations where the passenger module 22 is fully enclosed, the passenger module 22 may be pressurized separately from the airplane 20. Such pressurization may enhance the comfort of traveling for certain persons who are particularly affected by changes in altitude associated with conventional airplanes.

Another benefit of the passenger modules 22 is that the passenger modules 22 provide the passengers with separation from other passengers so as to avoid the transmission of pathogens between the passengers, which thereby enhances the safety of airplane travel.

The at least one person boards the passenger module 22 prior to boarding the airplane 20. Through such a system, it is possible for the passenger modules 22 to be filled such as in the airport terminal. Alternatively, it is possible for the passenger modules to be filled at a location that is not at the airport and then the filled passenger modules 22 will be delivered to the airport.

Particularly, where the passenger module 22 is at least partially enclosed, the passenger module 22 provides a greater degree of privacy to the persons in the passenger module 22. Such privacy when traveling may enable persons who typically travel in private airplanes to use this invention instead.

The use of the passenger modules 22 provides greater flexibility on where the persons are loaded and unloaded from the airplane 20. As such, this process may be done in a location where maintenance is being performed on the airplane 20 or at a location where the airplane 20 is being refueled.

Figure 4:
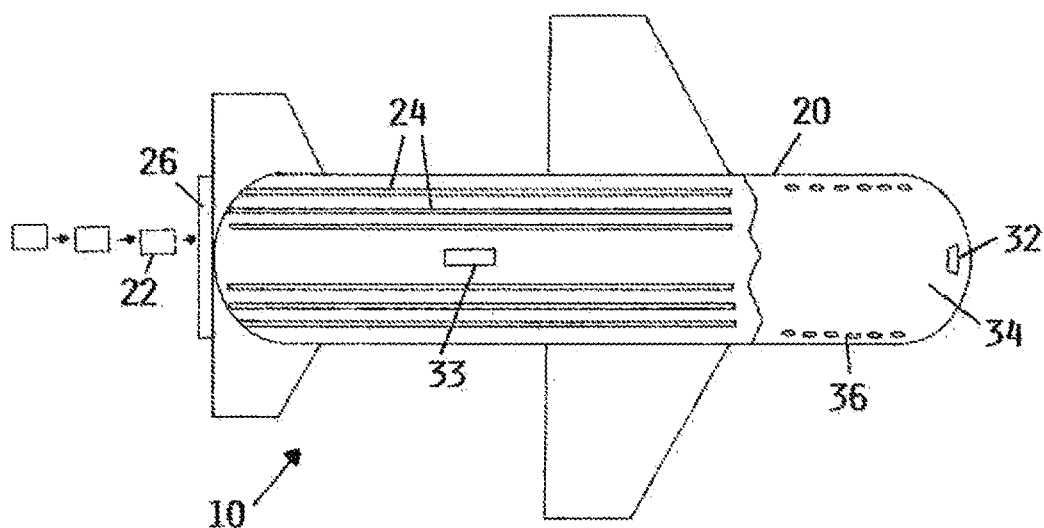
FIG. 4 is a top view of an alternate embodiment of the airplane passenger transport system that includes a plurality of passenger modules and an airplane.
Figure 2:
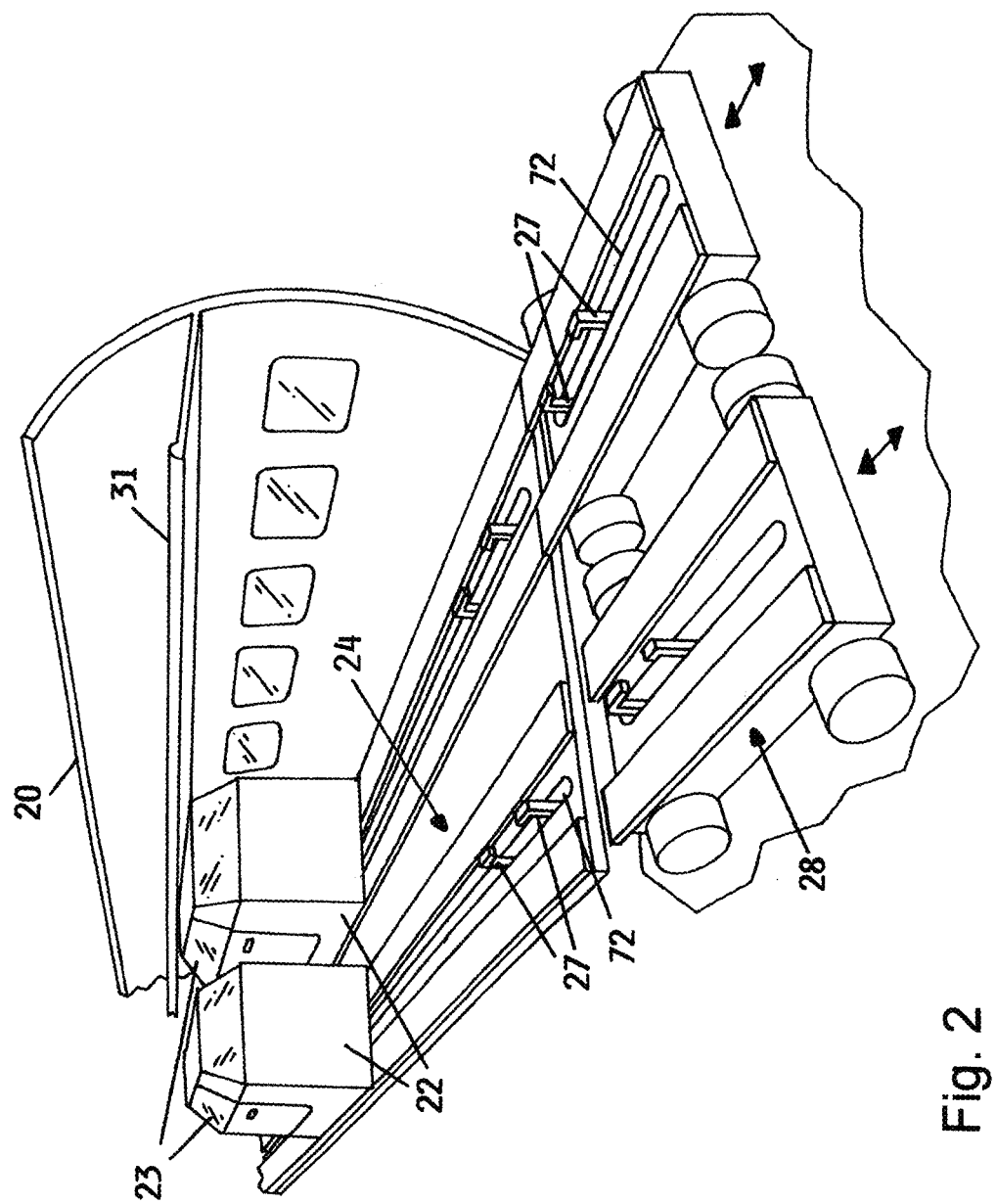
FIG. 2 is a perspective view of passenger modules moved from a transport module to the airplane.

The airplane 20 includes a system for moving the passenger modules 22 into the airplane 20. The system may include guidance to direct the passenger modules 22 to a specified location on the airplane 20. An example of one such guidance technique is a plurality of rails 24 over which the passenger modules 22 mover while being loaded onto the airplane 20 such as illustrated in FIGS. 1, 2 and 4. These rails 24 may be mounted in a spaced-apart configuration that is generally oriented from the back of the airplane 20 to the front of the airplane 20.

The airplane 20 may also include a ramp 26 that facilitates raising or lowering the passenger modules 22 to the appropriate height for loading onto the airplane 20 as illustrated in FIG. 3. Alternatively or additionally, systems may be provided at the airport for guiding the passenger modules 22 to the airplane 20 and then onto the airplane 20.

Through the use of the passenger modules 22 it is possible to load and unload the airplane 20 much more quickly as compared to the time it takes for individual passengers to load and unload from the airplane 20. Another benefit of the invention is that it enables the passengers to be loaded and unloaded at airports having less infrastructure than the airports that are conventionally used for passenger aircraft.

FIG. 2 illustrates passenger modules 22 being moved into position using a track 24 mounted to the airplane floor. Once the passenger module 22 is placed onto the track 24, the passenger module 22 is engaged by at least one clamp 27 that extends from the airplane floor. The at least one clamp 27 may be provided in a slot 72 in the airplane floor. This configuration may enable the at least one clamp 27 to be recessed in the slot 72 when the at least one clamp 27 is not being used.

Attachment of the passenger module 22 to the at least one clamp 27 enables the passenger module 22 to be moved inside of the airplane. The at least one clamp 27 also secures the passenger module 22 in the airplane 20 to prevent the passenger module 22 from moving in the airplane 20 while the airplane 20 is flying.

In addition to the track 24 on the airplane floor, the airplane 20 may include an upper guide support 31 that extends into the interior of the airplane 20 either to retain the passenger modules 22 in position or to guide the passenger modules 22 into position. The upper guide support 31 may also be used to store items similar to storage bins on a conventional passenger airplane.

FIG. 2 also illustrates a wheeled base module 28 that is positioned proximate an end of each track 24. The passenger module 22 is placed on the wheeled base module 28 to move the passenger module 22 on the ground. Similar to the airplane, the wheeled base module 28 may include at least one clamp 27 that engages the passenger module 22 to retain the passenger module 22 in a substantially stationary position on the wheeled base module 28.

The wheeled base module 28 may be powered using a variety of mechanisms such as an electric motor and a battery. The wheeled base module 28 may include a steering mechanism (not shown) to change the direction of the wheeled base module 28. The direction of the wheeled base module 28 may be controlled using a variety of techniques such as by a person in the passenger module 22 that is mounted to the wheeled base module 28. Alternatively or additionally, the movement of the wheeled base module 28 may be controlled remotely.

Figures 1, 2A:
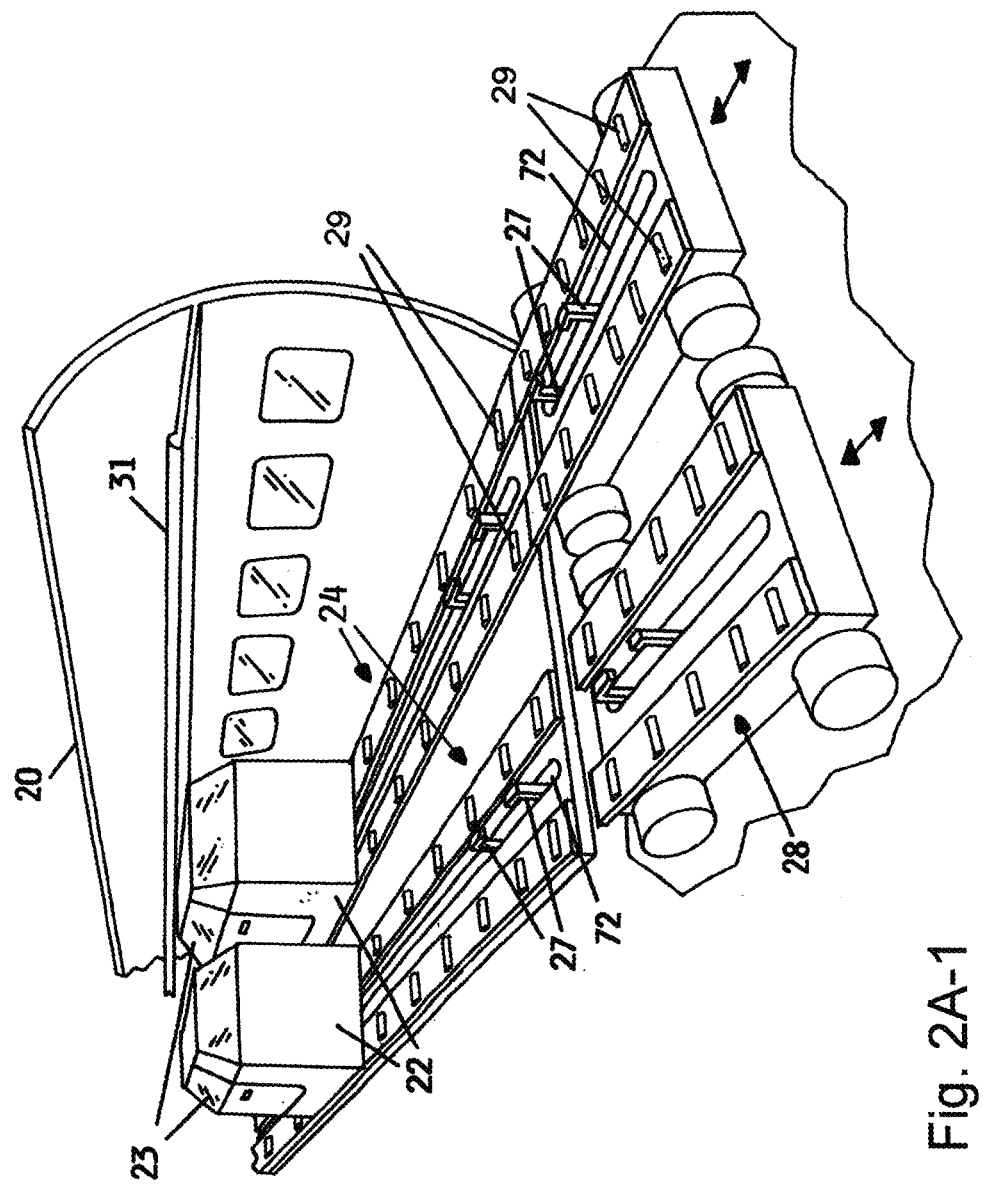
Figures 2, 2A:
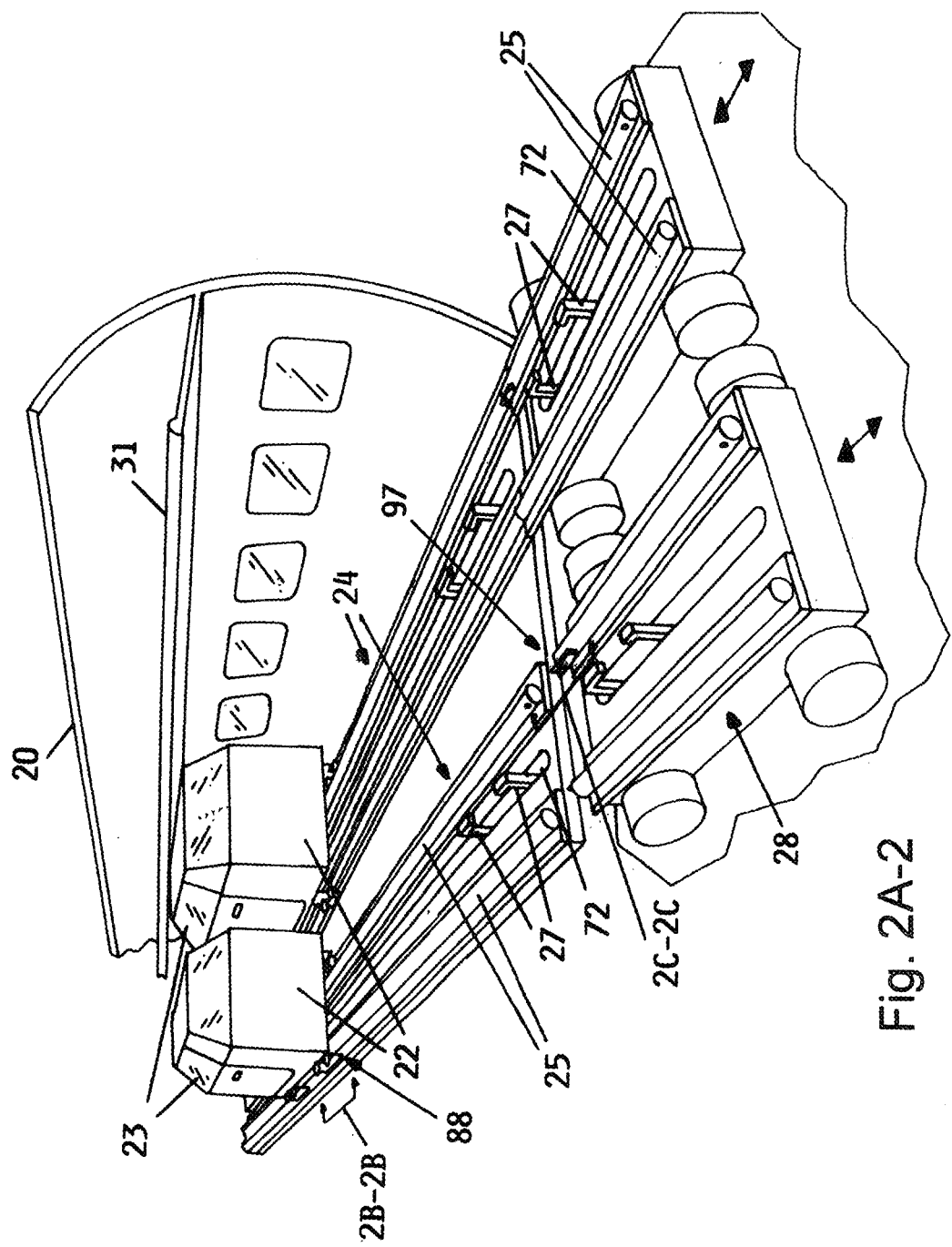

Referring to FIG. 2A-1, the weight of the passenger module 22 may present issues with moving the passenger module 22 in the airplane 20 as well as on the power wheeled base 28. Free-motion rollers 29 may be used to enhance the ability of the clamps 27 to handle the weight of the passenger module 22 as well as the contents of the passenger module 22 such as persons and luggage. The free-motion rollers 29 may enhance the ability to transfer the passenger module 22 between the similar and different modes of transport.

The free motion rollers 29 may be mounted on a track system 24, located on the airplane 20 and wheeled base module 28. The free motion rollers 29 may also improve the transfer-ability of the passenger module 22 from the power wheeled base module 28 onto the airplanes track system 24 and vice-versa. This is accomplished by both moveable and stationary clamps 27 with the addition of the free motion rollers 29.

In conjunction with clamps 27, an alternative method may utilize the free-motion rollers 29 on the bottom of the passenger module 22, which would be in contact with a flat surface on both the airplane 20 and power wheeled base 28.

FIGS. 2A-1 and 2A-2 illustrates an alternative mechanism for guiding the passenger module 22 within the airplane 20 and on the power wheeled base 28. This is accomplished by a wheel assembly 88 that is located on the bottom of module 22 along with clamps 27 that are both stationary and moveable.

Figure 2B:
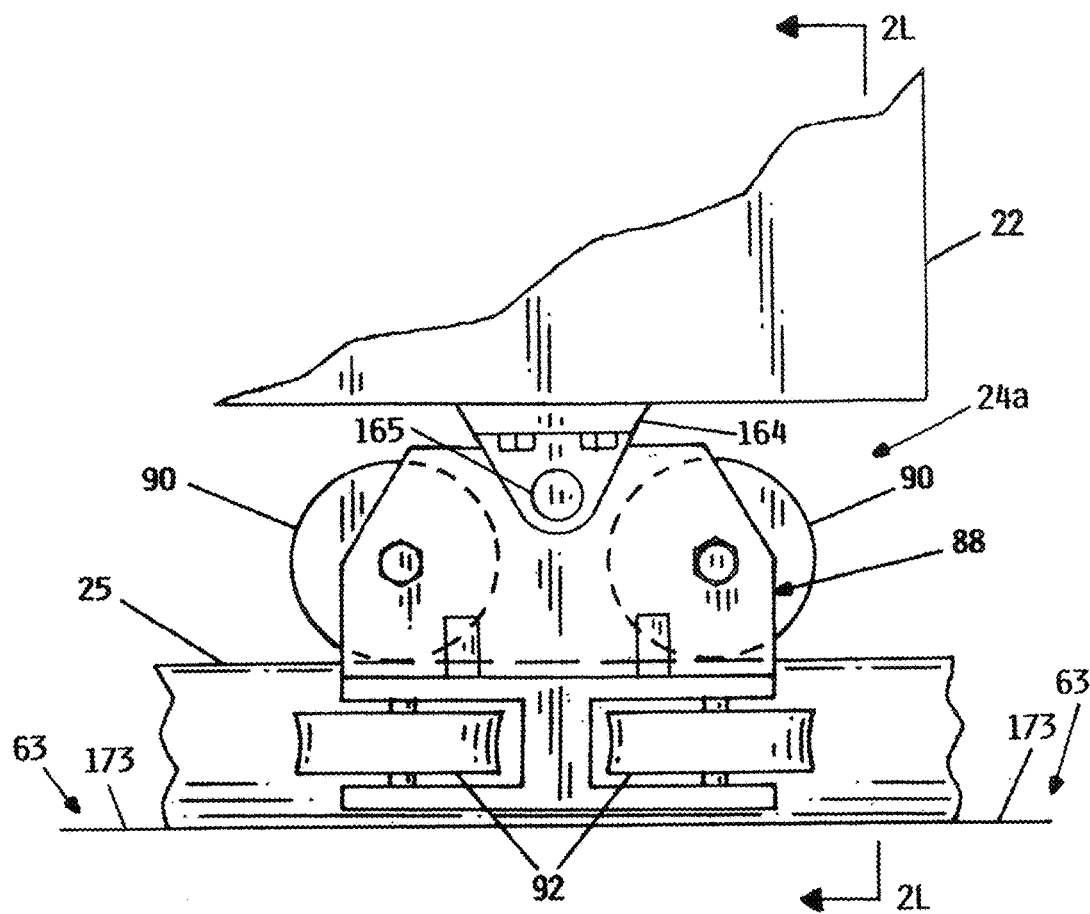
FIG. 2B is a side view of a wheel assembly for the passenger module.

As illustrated in FIG. 2B, the wheel assembly 88 consists of running wheels 90 and side wheels 92, which move along the rail 25. The side wheels 92 are positioned on the outside of the rail 25. This configuration allows docking connection aligning sensors 94 and tension release clamps 102 to be located on the inside of the rail or track 25.

Figure 2C:
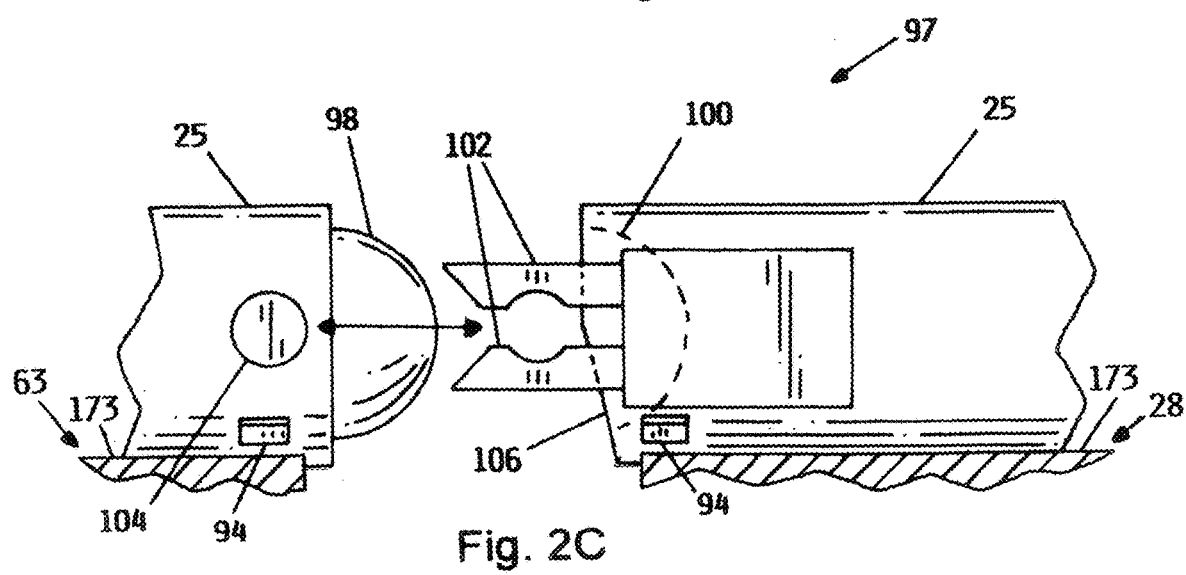
FIG. 2C is a side view of a docking connection mechanism between the transport module and the airplane.

FIG. 2C illustrates the docking mechanism 97 between the rails 25 on the airplane 20 and the power wheeled base 28. As their respective rail 25 approach each other, aligning sensors 94 guide the connection. They are then brought together by a half-sphere 98 and a sphere receiver 100 that is located on the end of the rail 25.

There may be a slightly angled surface 106 on the rail 25 receiving end of the powered wheeled base 28 to accommodate an inclined surface. At approximately the same time the spheres 98, 100 are engaging, the tension release clamp 102 is engaged to a receiving post 104. This method holds the power wheeled base rail 25 with the airplanes rail 25 but allows them to separate when force or a mechanical release is activated and applied.

Figure 2D:
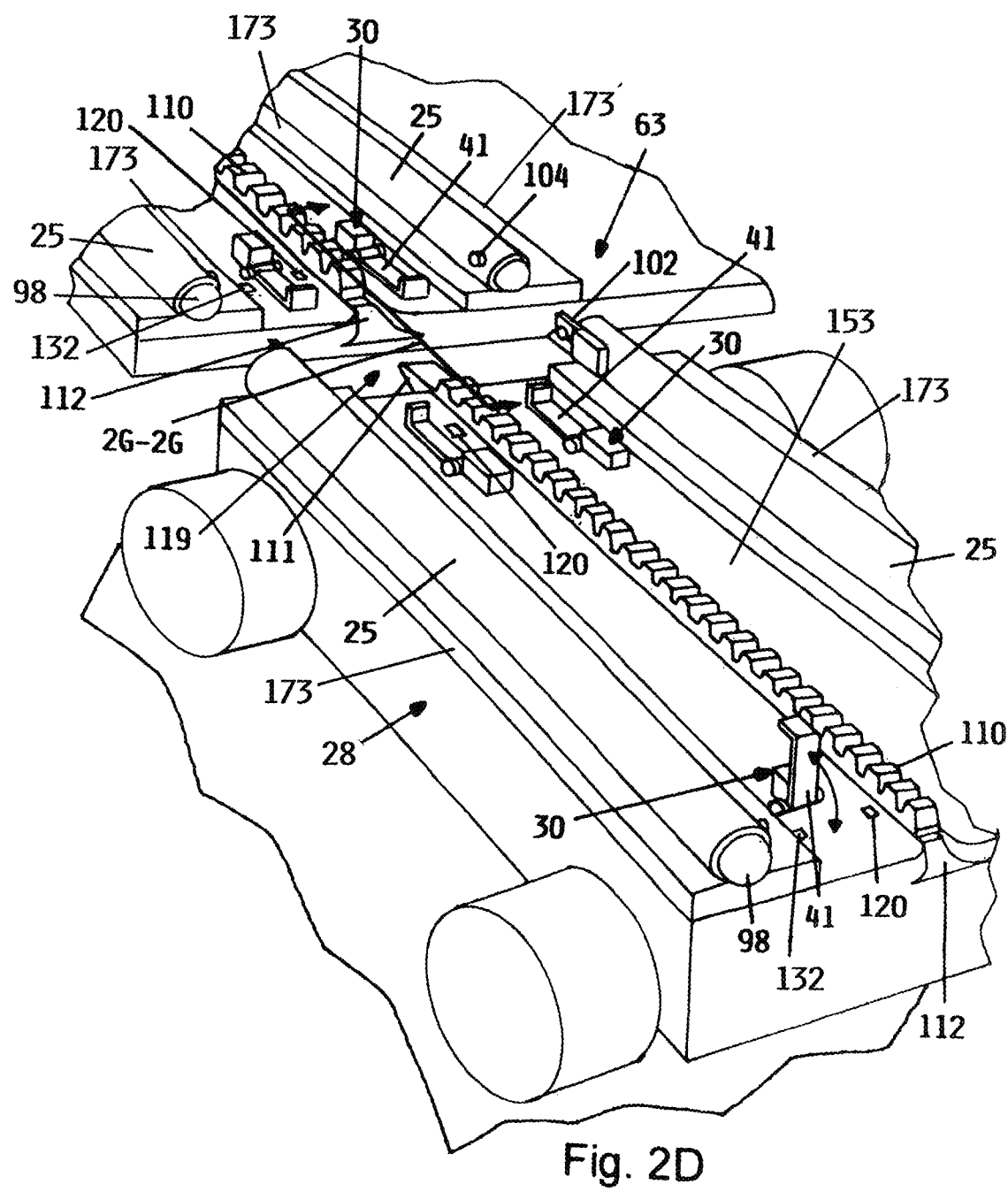
FIG. 2D is a perspective view of an alternative structure for moving and clamping the passenger module.

FIG. 2D illustrates an alternative method of moving and clamping of the passenger module 22. The transfer of a cog wheel or pinion gear from one gear rack to another could present problems. There might be a mismatch in initial gear teeth engagement. The following method addresses this issue. This method positions a tongue and guide docking system 119 in accordance with wheel assembly 88 (FIG. 2B) and docking mechanism 97 (FIG. 2C). The clamping mechanisms 30 with clamps 41 engage module 22 when it becomes stationary on the airplane floor 63 and on the power wheeled base 28.

Figure 2E:
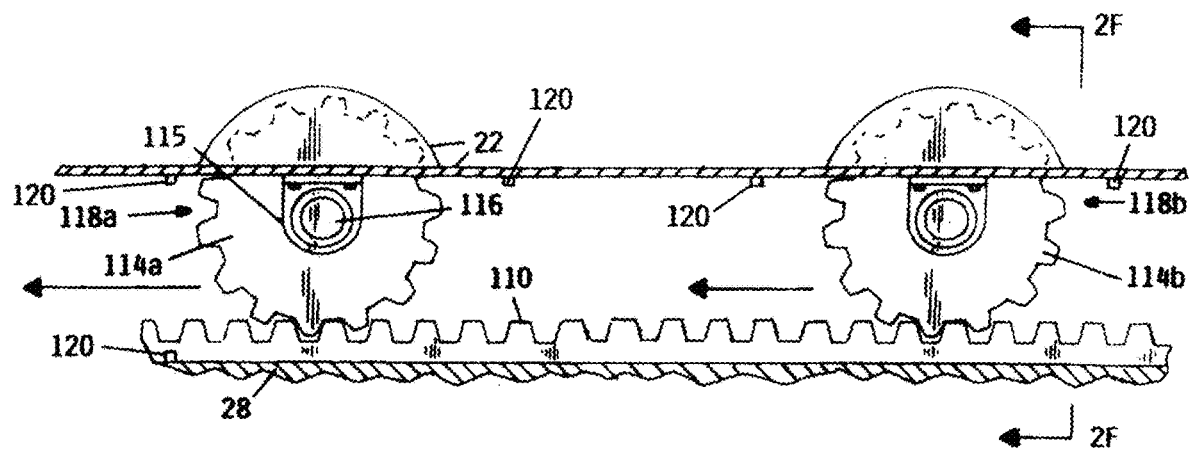
FIG. 2E is a side view of two gear-powered drives moving the passenger module along the gear track.

FIG. 2E illustrates the two gear powered drives 118a, 118b moving module 22 along gear rack 110 on power wheeled base 28. The pinion gears 114a, 114b, which are powered independently, engages gear rack 110 on powered wheeled base 28. It is then transferred to the gear rack 110 on the airplane floor. This is accomplished by the two gear powered drives 118a, 118b. The initial gear 114a transverses the toothless tongue 111 of guide docking system 119 (FIG. 2I). Gear 114a can be disengaged from its power source and allowed free movement while gear 114b remains powered-up. The process can be reversed with gear 114b powered-down and gear 114a powered-up. Sensors 120 can indicate when this is to occur. These sensors 120 may be located on the passenger module 22, the power wheeled base 28, and the airplane floor 63 (FIG. 2D, FIG. 2E, FIG. 2F).

Figure 2F:
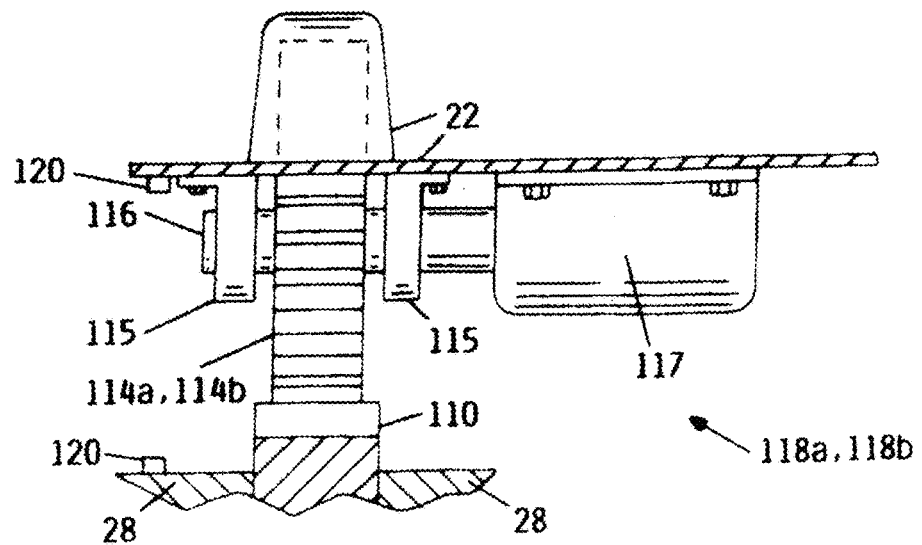
FIG. 2F is a cross-sectional view taken along a line 2F-2F in FIG. 2E.

FIG. 2F is cross-section view illustrating gear drives 118a, 118b with motor 117, drive shaft 116, and pillow blocks 115. Pinion gears 114a, 114b are moving along the stationary gear rack 110.

Figure 2G:
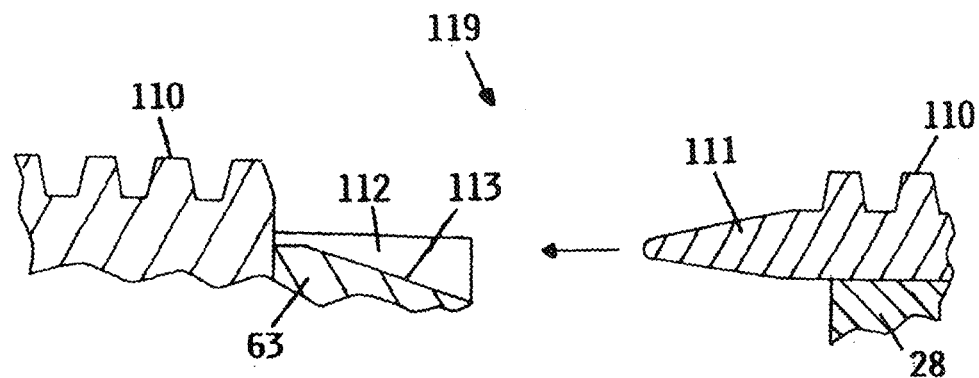
FIG. 2G is an enlarged side view of a tongue and guide docking system for use with the invention.

FIG. 2G illustrates the tongue and guide docking system 119. The protruding tongue 111 of gear rack 110 on the power wheeled base is approaching guide 112 on airplane floor 63.

Figure 2H:
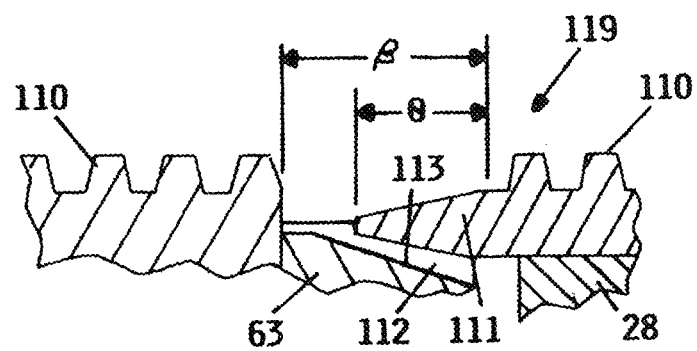
FIG. 2H is an enlarged side view of the tongue and guide docking system of FIG. 2G as the tongue approaches the guide.
Figure 2I:
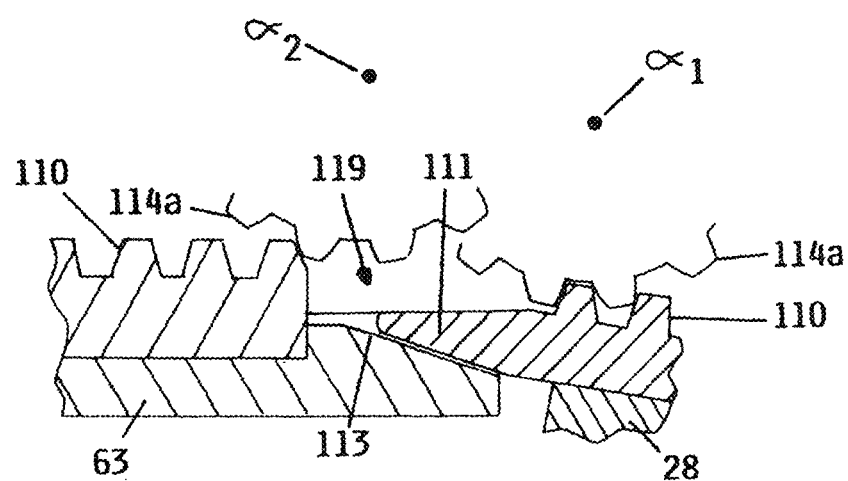
FIG. 2I is an enlarged schematic side view of the transition of pinion gear on the gear track.

FIG. 2H illustrates a relatively level approach and connection of tongue 111 into guide 112. The toothless gear rack span θ is less than β. This configuration accommodates the differences in length of the tongue 111 with the guide 112. An inclined surface 113 accommodates the relative angle of engagement.

FIG. 2I illustrates the transition of pinion gear 114a on the gear rack of the power wheeled base 28 to the gear rack on the airplane floor 63. $\alpha_1$ represents the center axis of the gear 114a on its path to $\alpha_2$, which represents the maximum upper limit, before full engagement with gear rack 110 on the airplane. This is all accomplished by correlating the tongue and guide docking system 119 with wheel assembly 88 (FIG. 2B) and docking mechanism 97 (FIG. 2C).

Figure 2J:
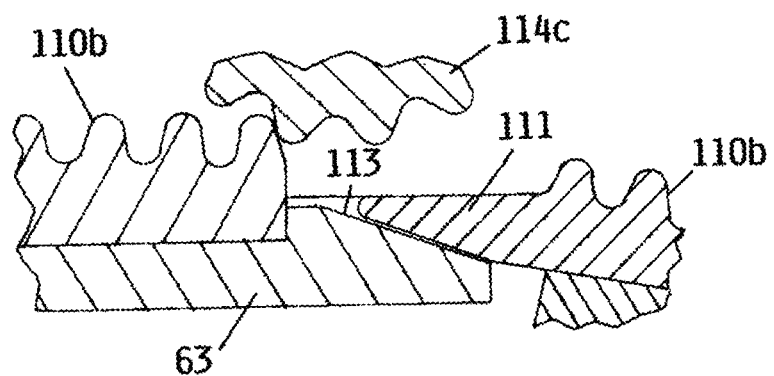
FIG. 2J is an enlarged side view of an alternative profile of the pinion gear and the gear track.

FIG. 2J illustrates an alternative profile to aid the engagement of gear teeth on both the pinion gear 114c and the gear rack 110b.

Figure 2K:
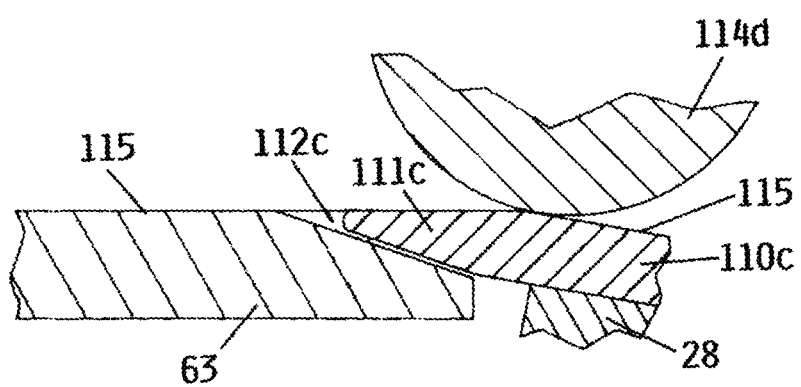
FIG. 2K is an enlarged side view of a round drive wheel used on the guide docking system.

FIG. 2K illustrates another alternative view of a round drive wheel 114d that travels on a relatively flat surface 115. Item 110c has its corresponding tongue 111c, which engages the guide 112c on the airplane floor 63.

FIG. 2L is a cross-section view illustrating the track system 24a which shows the relationship between the passenger module 22, the wheel assembly 88, and the rail 25. Shown is one of two running wheels 90 and one of two side wheels 92 in contact with rail 25. A base plate 173 is used for attaching rail 25 to the airplane floor 63 and power wheeled base 28 (FIG. 2D). The rail 25 is mounted to the airplane floor 63 by bolt 166. The rail 25 is then attached such as by welding to a slight groove 172 on the base plate 173. Also illustrated are module connectors 164 with shaft 165 and spacers 167. Spacers for shafts 170 and 171 are shown respectively as 168 and 169. Track system 24a is also used on the power wheeled base 28 (FIG. 2O).

As illustrated in FIG. 2L, the rail 25 has a circular profile. A surface of the running wheels 90 that engages the rail 25 may have a concave shape that corresponds to the shape of the rail 25 as illustrated in FIG. 2L. A surface of the side wheels 92 that engages the rail 25 may have a concave shape that corresponds to the shape of the rail 25 as illustrated in FIG. 2L.

FIG. 2M shows an alternative embodiment of securing the rail 25 onto the power wheeled base 28. Illustrated is an alternative support structure 178 that is attached to surface 153 of the power wheeled base 28. Shown are frame members 177 and grooves 176. Grooves 176 are aligned for the attachment of rail 25 (FIG. 2N). The support structure 178 also supports the gear rack 110 and guide 112. In this alternative embodiment, the support structure 178 is also used on the airplane floor 63 (not shown).

FIG. 2N is a partial top view of support structure 178 on the power wheeled base 28. Illustrated is the support structure 178 attached to the surface 153 of the power wheeled base 28. The rails 25 are attached to the grooves 176 in the frame members 177. Also shown is the receiving post 104 and a half-sphere 98 on the rail 25.

FIG. 2O is a schematic side view illustrating the position and travel path of the passenger module 22 along the rail 25. The rails 25 on the airplane floor 63 are like the rails on the power wheeled base 28 with respective docking mechanisms 97. The wheel assemblies 88 travel in the same linear path as the two gear powered drives 118a and 118b. The passenger module 22 has connectors 164 which are connected to the shaft 165. The shaft 165 in the wheel assembly 88 is allowed to rotate with the modules position.

FIG. 3 illustrates an alternative technique for delivering the passenger modules 22 to the airplane 20 using a conventional truck 29 on which the passenger modules 22 are placed. This technique is suited for use with passenger modules 22 that include wheels or do not include wheels. Once the truck 29 is positioned proximate the airplane 20, a ramp 26 may be used to move the passenger modules 22 from the truck 29 to the airplane 20.

Another embodiment of the invention is illustrated in FIG. 4. This embodiment of the airplane passenger transport system 10 is similar to the airplane passenger transport system 10 described above with respect to FIG. 1 except that the passenger modules 22 are only place in a portion of the airplane 20. For example, the front portion of the airplane 20 may include individual seats. This embodiment may also include bathroom(s) and/or refreshment area(s) 33 that are similar to a conventional passenger transport airplane.

This embodiment illustrates that the airplane 20 includes a plurality of windows 36 in the portion of the airplane with the individual seats. Windows 36 may also be provided in the portion of the airplane 20 where the passenger modules 22 are located. This embodiment also illustrates a window 32 at the front of the airplane 20 at and near where the cockpit 34 is located. While not illustrated, a bathroom and/or a refreshment area may be located in the cockpit 34.

Figure 5:
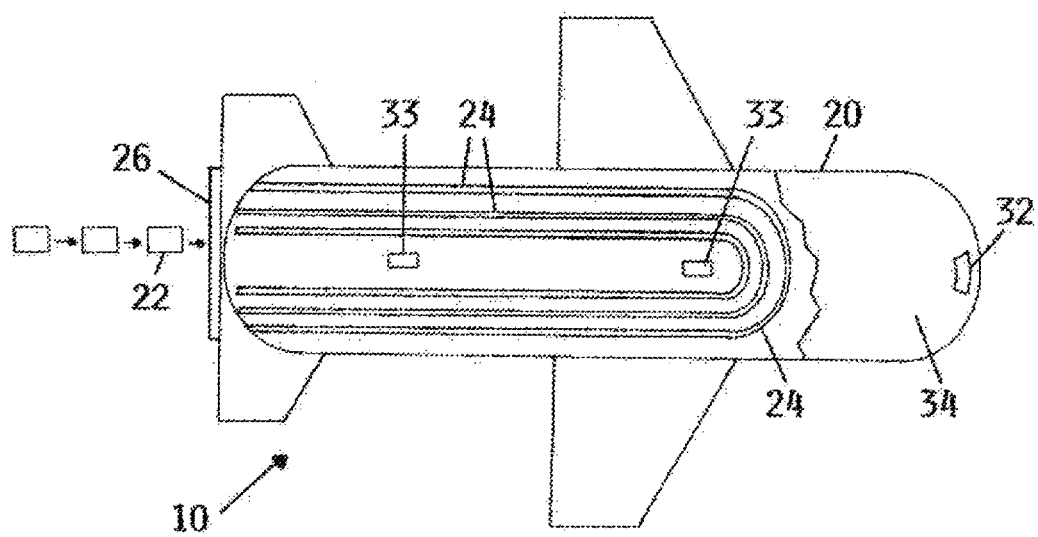
FIG. 5 is a top view of another embodiment of the airplane passenger transport system that includes a plurality of passenger modules and an airplane.

Another embodiment of the invention is illustrated in FIG. 5. This embodiment of the airplane passenger transport system is similar to the airplane passenger transport system 10 described above with respect to FIG. 1 except that the track 24 is curved proximate the front of the airplane 20. The curved track 24 increases the flexibility of moving the passenger modules 22 in the airplane 20. This embodiment may also include bathroom(s) and/or refreshment area(s) 33 that are similar to a conventional passenger transport airplane.

Figure 6:
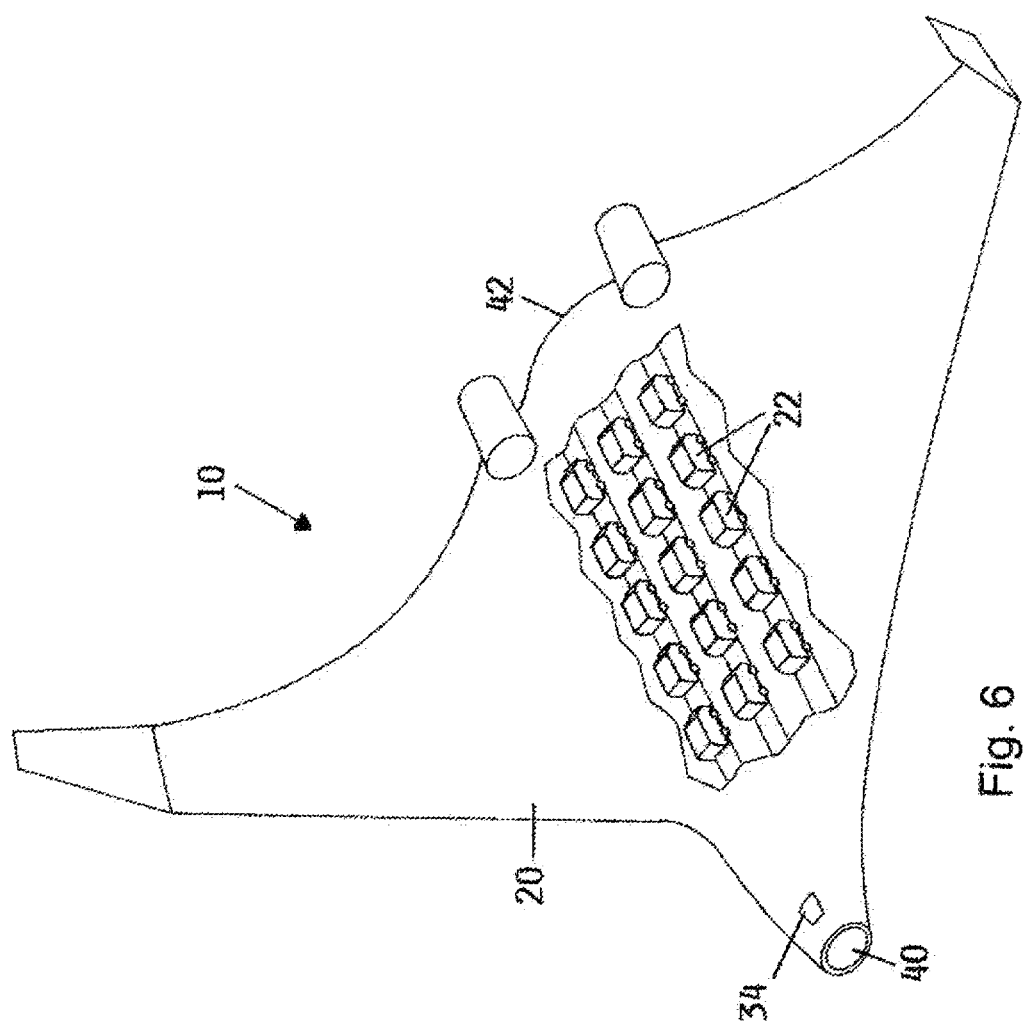
FIG. 6 is a perspective view of another embodiment of the airplane passenger transport system that includes a plurality of passenger modules and an airplane.

An alternative configuration for the airplane 20 is set forth in FIG. 6. Otherwise, the configuration and use of the airplane passenger transport system of this embodiment may be similar to the configuration and use of the other embodiments of the airplane passenger transport system 10 such as set forth in FIG. 1.

A difference of this embodiment is that the passenger modules 22 may be loaded onto the airplane 20 from the front 40 of the airplane and unloaded from the airplane 20 from the back 42 of the airplane. Such a process may further decrease the time to load and unload the passenger modules 22 because the loading and unloading of the passenger modules 22 may be done simultaneously.

Figure 7:
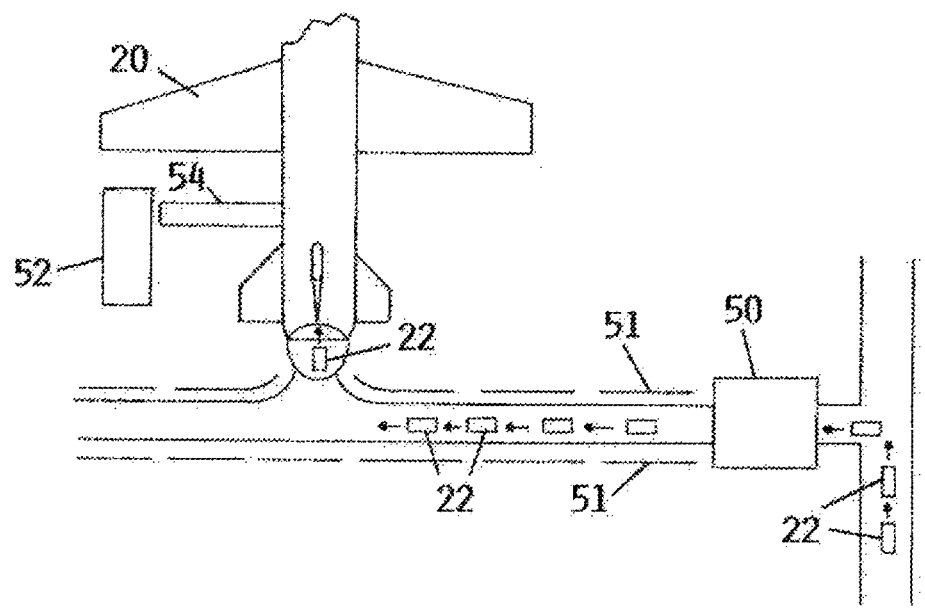
FIG. 7 is a top view illustrating loading passenger modules on the airplane.

FIG. 7 illustrates additional details relating to loading and unloading of the passenger modules 22 on the airplane 20. In situations where the passenger modules 22 include their own power source, the passenger modules 22 may be driven by the persons therein to the airplane 20. The passenger modules 22 would pass through a security checkpoint 50 set up in the security perimeter 51 and then be driven or otherwise moved onto the airplane 20. In addition to functioning as a security checkpoint 50, it is also possible for this structure to function as an airline check-in that is similar to what is typically found in a conventional airport terminal.

The passenger modules 22 may be owned by the airport, the company operating the airplane 20 or the person(s) who are being transported in the passenger modules 22. Alternatively, the passenger modules 22 may be rented similar to a conventional car rental.

The passenger modules 22 may be configured for driving on roads similar to conventional automobiles. Alternatively, the passenger modules 22 may be particularly configured for use in conjunction with the airplane passenger transport system.

This embodiment also illustrates the use of a transport vehicle 52 such as a bus that drives individual passengers to the airplane 20. Upon exiting the transport vehicle 52, the persons would walk up a portable staircase or ramp 54 to get onto the airplane 20.

FIGS. 8-12 illustrate mechanisms for securing the passenger module 22 in the airplane 20 when the passenger module 22 includes wheels 60 that facilitate moving the passenger module 22 either on the ground or inside of the airplane 20.

Figure 8:
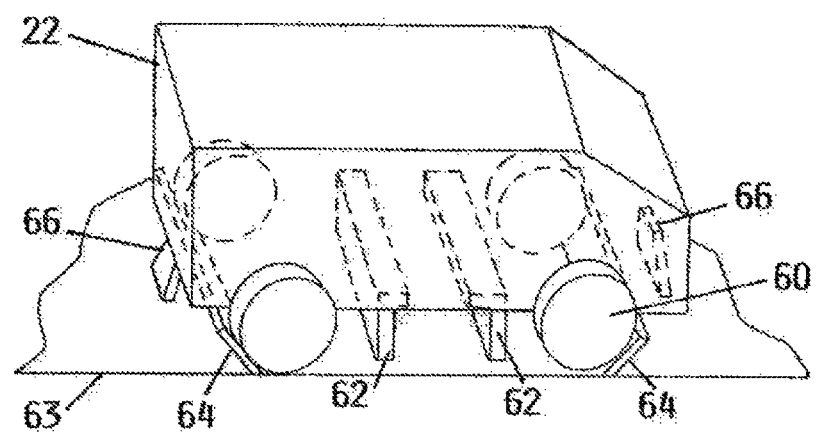
FIG. 8 is a perspective view illustrating securing the passenger modules in the airplane.

One technique that may be used to restrict movement of the passenger module 22 is a clamp 62 that raises from the airplane floor 63 and contacts a lower surface of the passenger module 22 as illustrated in FIG. 8. Another technique for restricting movement of the passenger module 22 includes braces 64 that are placed behind the rear wheel 60 and in front of the front wheel 60. Yet another technique for restricting movement of the passenger module 22 includes a clamp 66 that extends from the airplane floor 63 and engages the passenger module 22 proximate the rear and front ends thereof.

Figure 9:
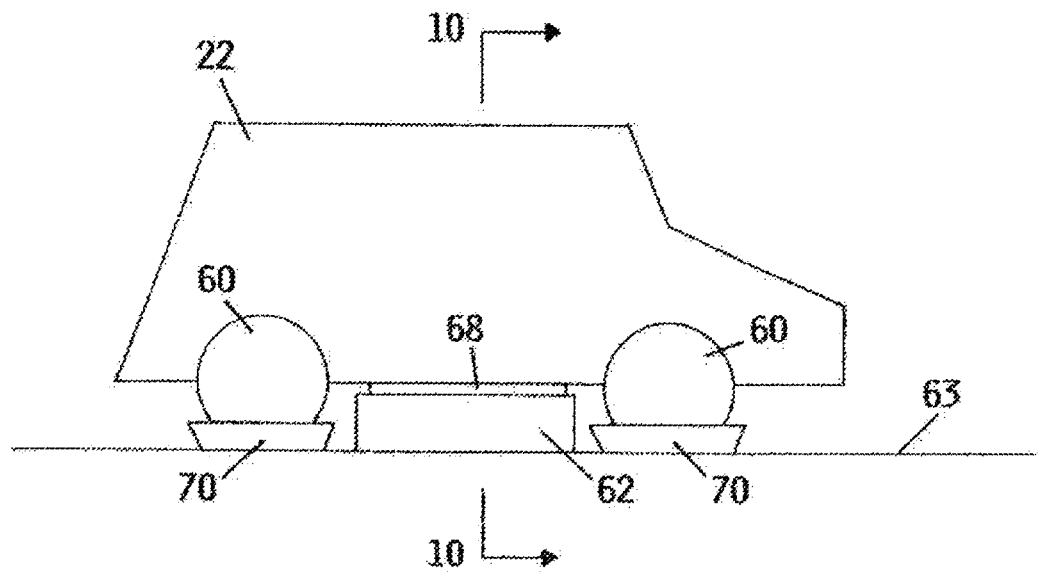
FIG. 9 is a side view illustrating an alternative mechanism for securing the passenger module in the airplane.

Still another technique that may be used to restrict movement of the passenger module 22 includes wheel holders 70 that receive a portion of at least one of the wheels 60 as illustrated in FIG. 9. The wheel holders 70 may be stationary mounted to the airplane floor 63. Alternatively or additionally, the wheel holders 70 may be used to move the passenger module 22 in the airplane 20 similar to what is done in certain car washes.

Figure 10:
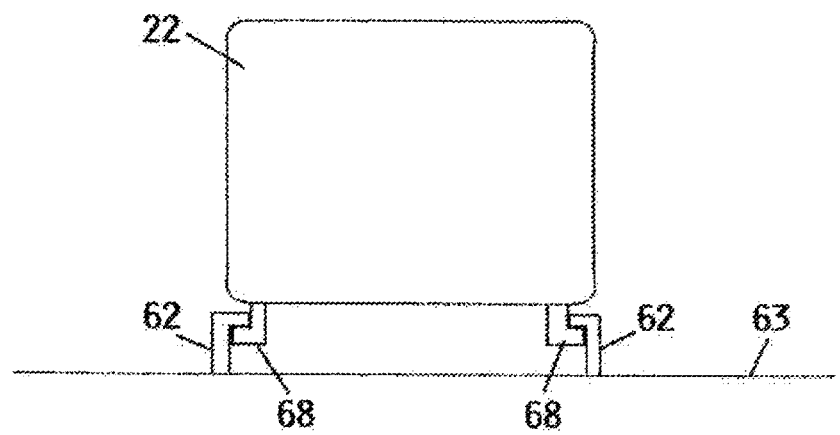

FIGS. 9 and 10 illustrate an alternative mechanism for retaining the passenger module 22 in a stationary position with respect to the airplane floor 63 that includes clamps 62 that extend from the airplane floor 63 and engage members 68 that extend from the lower surface of the passenger module 22.

Figure 11:
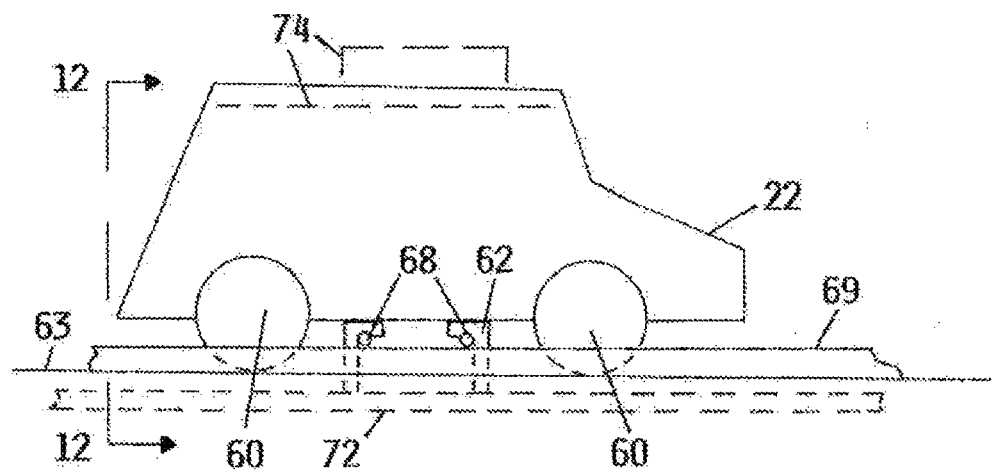
FIG. 11 is a side view illustrating an alternative mechanism for securing the passenger module in the airplane.
Figure 12:
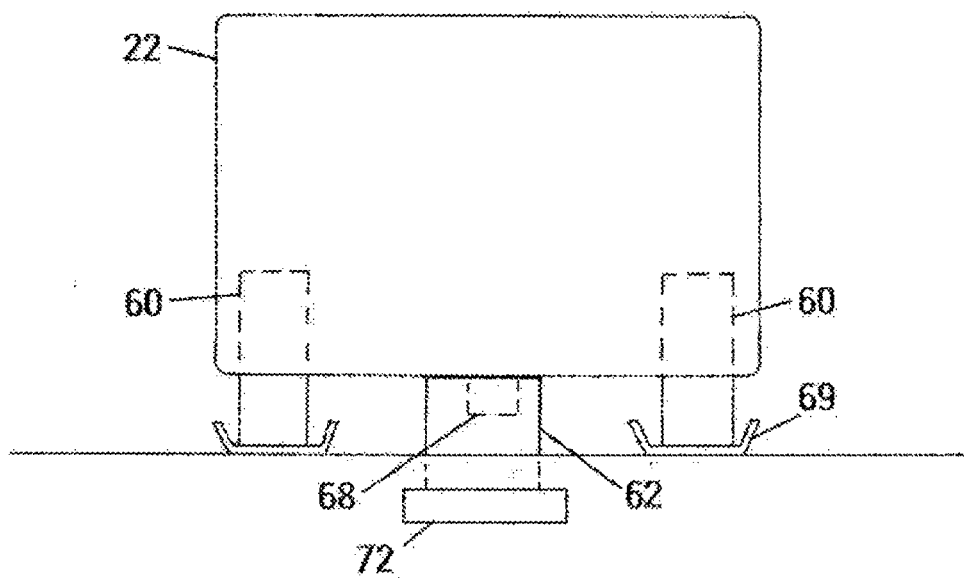
FIG. 12 is an end view of the passenger module taken along a line 12-12 in FIG. 11.

FIGS. 11 and 12 illustrate an alternative configuration of the clamps 62 that extend from the airplane floor 63 and engage a member 68 that extends from a lower surface of the passenger module 22. This embodiment also includes an elongated U-shaped track 69 that is mounted to the airplane floor 63. The U-shaped track 69 is adapted to receive at least one of the front and rear wheels 60. In addition to restricting movement of the wheels 60, the U-shaped track may also guide movement of the passenger module 22 during the process of loading or unloading the airplane 20.

FIG. 11 also illustrates a parachute 74 attached to the passenger module 22 to provide additional safety to the occupants of the passenger module 22 in case of something happens to the airplane 20.

Figure 13:
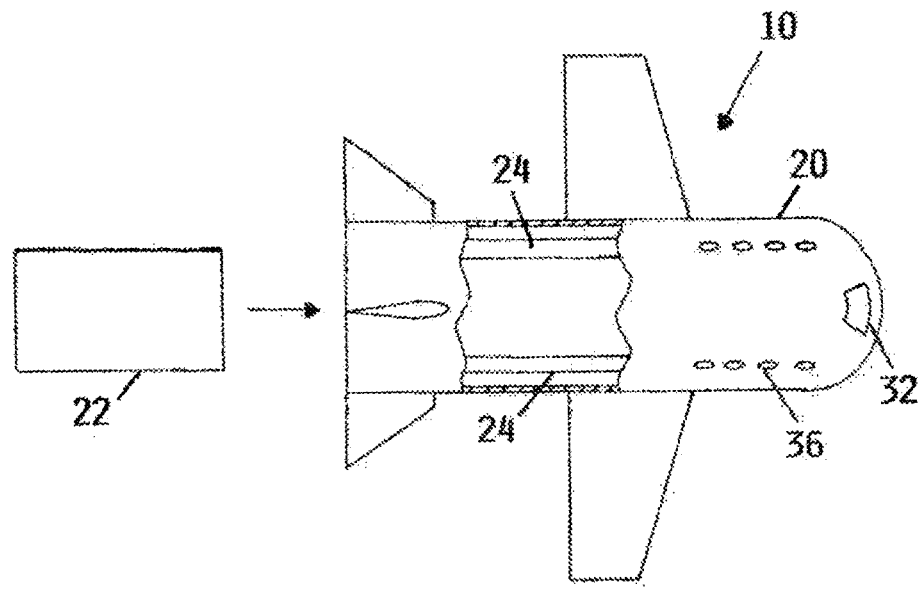
FIG. 13 is a top view of another embodiment of the airplane passenger transport system that includes one passenger module and an airplane.

Yet another configuration of the airplane passenger transport system is illustrated in FIG. 13. The elements of this embodiment are similar to the airplane passenger transport system illustrated in FIG. 1. However, this embodiment is adapted to receive a single passenger module 22. Depending on the size of the airplane 20, the passenger module 22 may have a larger size similar to a conventional bus.

Figure 14:
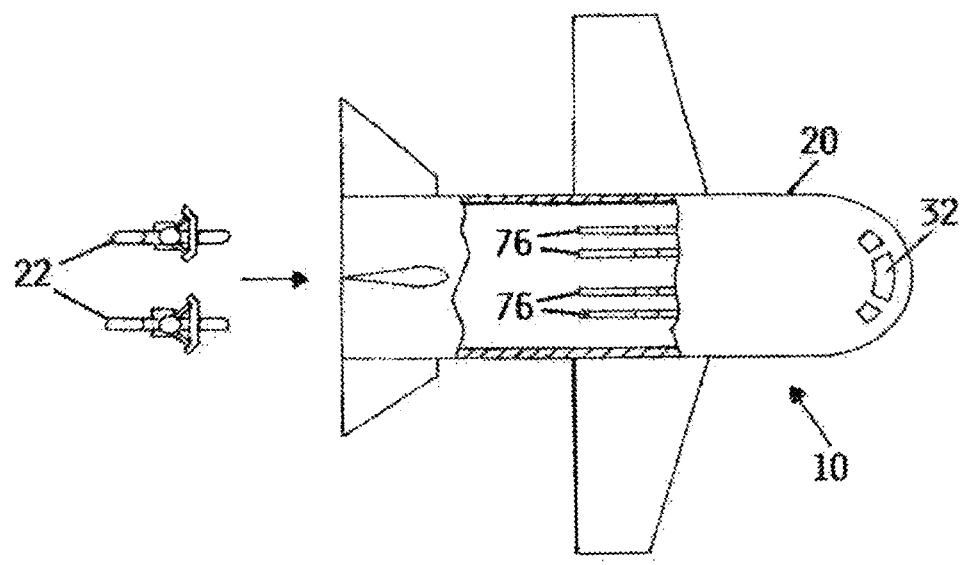
FIG. 14 is a top view of another embodiment of the airplane passenger transport system that includes two passenger modules and an airplane.

Similar to FIG. 13, FIG. 14 illustrates an airplane passenger transport system that is design for use with two passenger modules 22. In one such configuration, the passenger module 22 is similar to a conventional motorcycle. The airplane 20 includes a mounting bracket 76 for each of the passenger modules 22.

Figure 15:
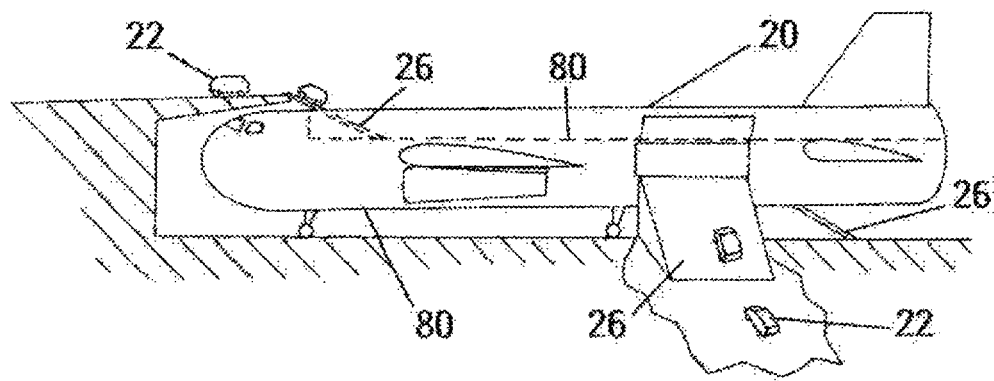
FIG. 15 is a side view of another embodiment of the airplane passenger transport system that includes a plurality of passenger modules and an airplane.

FIG. 15 illustrates an airplane 20 having multiple levels 80 on which the passenger modules 22 may be placed on the airplane 20. Each level includes a ramp 26 for loading and unloading the passenger modules 22.

Figure 16:
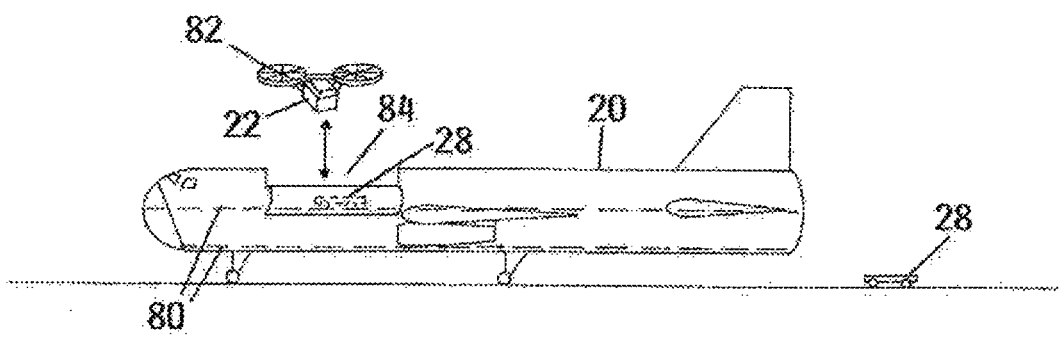
FIG. 16 is a side view of another embodiment of the airplane passenger transport system that includes an aircraft for bringing passenger modules to an airplane.

FIG. 16 illustrates another technique for loading and unloading passenger modules 22 using another aircraft 82 such as drone through an opening 84 in the upper surface of the airplane 20. The drone 82 carries the passenger modules 22. Similar to the embodiment illustrated in FIG. 15, the airplane 20 includes multiple levels 80 on which the passenger modules 22 can be placed. FIG. 16 also illustrates a wheeled base module 28 positioned adjacent to the airplane 20 from which the passenger module 22 has been removed therefrom by the drone 82.

Figure 17:
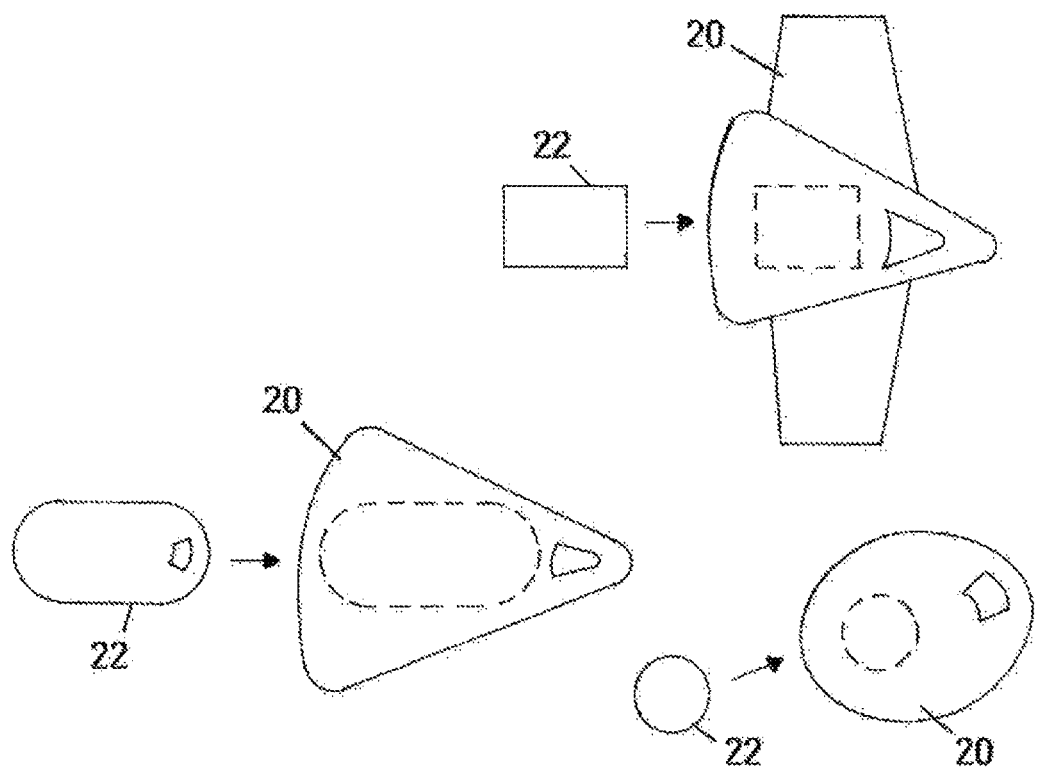
FIG. 17 is a top view of other embodiments of the airplane passenger transport system that includes a passenger module and an aircraft.

FIG. 17 illustrates a few other alternative configurations of the airplane 20 and the passenger module 22 using the concepts of this invention.

Figure 18A:
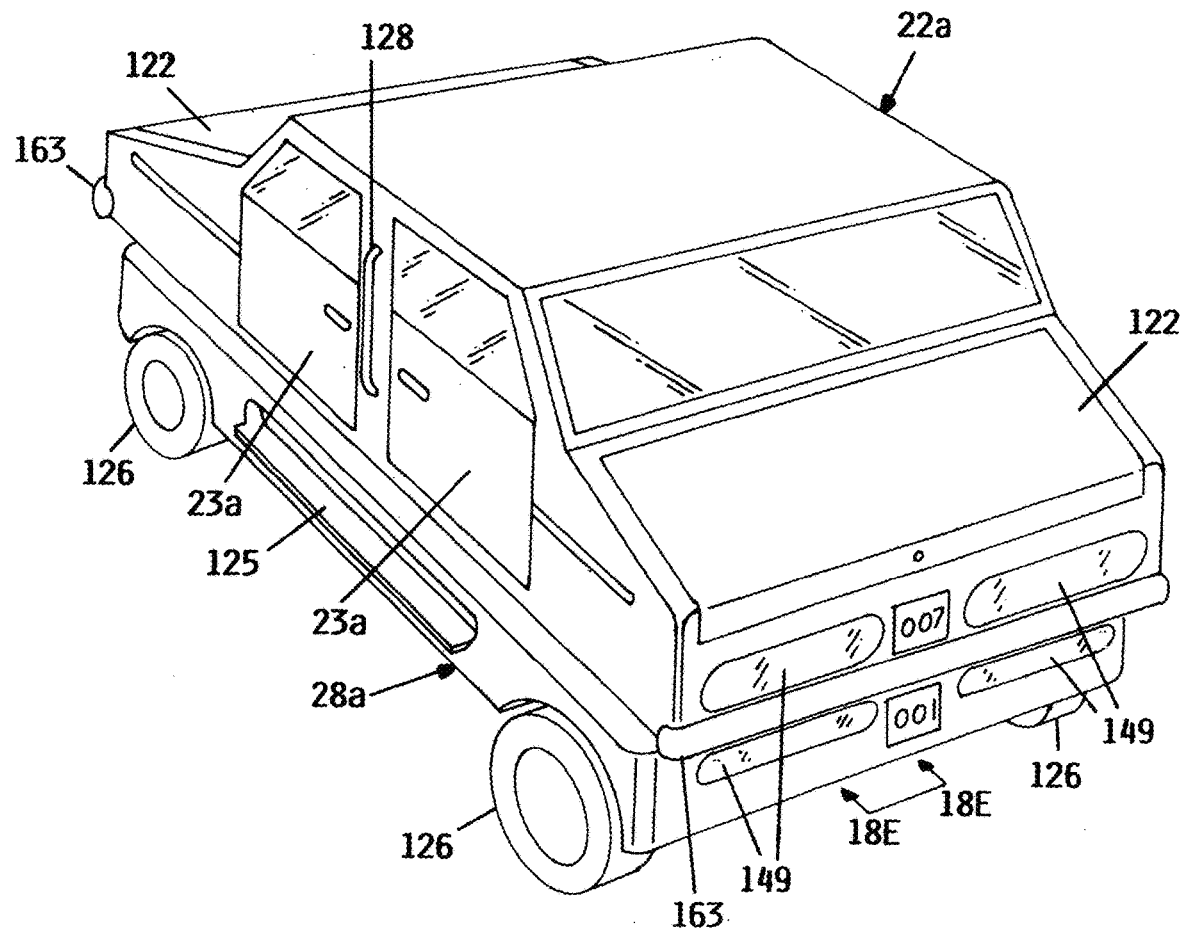
FIG. 18A is a perspective view of an alternative embodiment of the passenger module.

FIG. 18A illustrates an alternative embodiment of the passenger module 22a and the power wheeled base 28a. Items identified on passenger module 22a are storage compartments 122, grab bar 128, light bars 149, sliding doors 23a and bumpers 163. It also has wheel assemblies 88 (FIG. 2B), two gear powered drives 118a, 118b along with their associated sensors 120 (FIGS. 2E and 2F), and clamp receivers 121 (FIGS. 18E and 18F).

Illustrated on the power wheeled base 28a are wheels 126, foot rest 125, and light bars 149. It also has rails 25, clamps 102, posts 104, half-spheres 98, sphere receivers 100, and sensors 94 (FIG. 2C). Also included are gear rack 110, tongue 111, guide 112, and sensors 120 (FIG. 2D). It also contains clamping mechanisms 30a with clamps 41a, and sensors 132 (FIG. 18E).

Figure 18B:
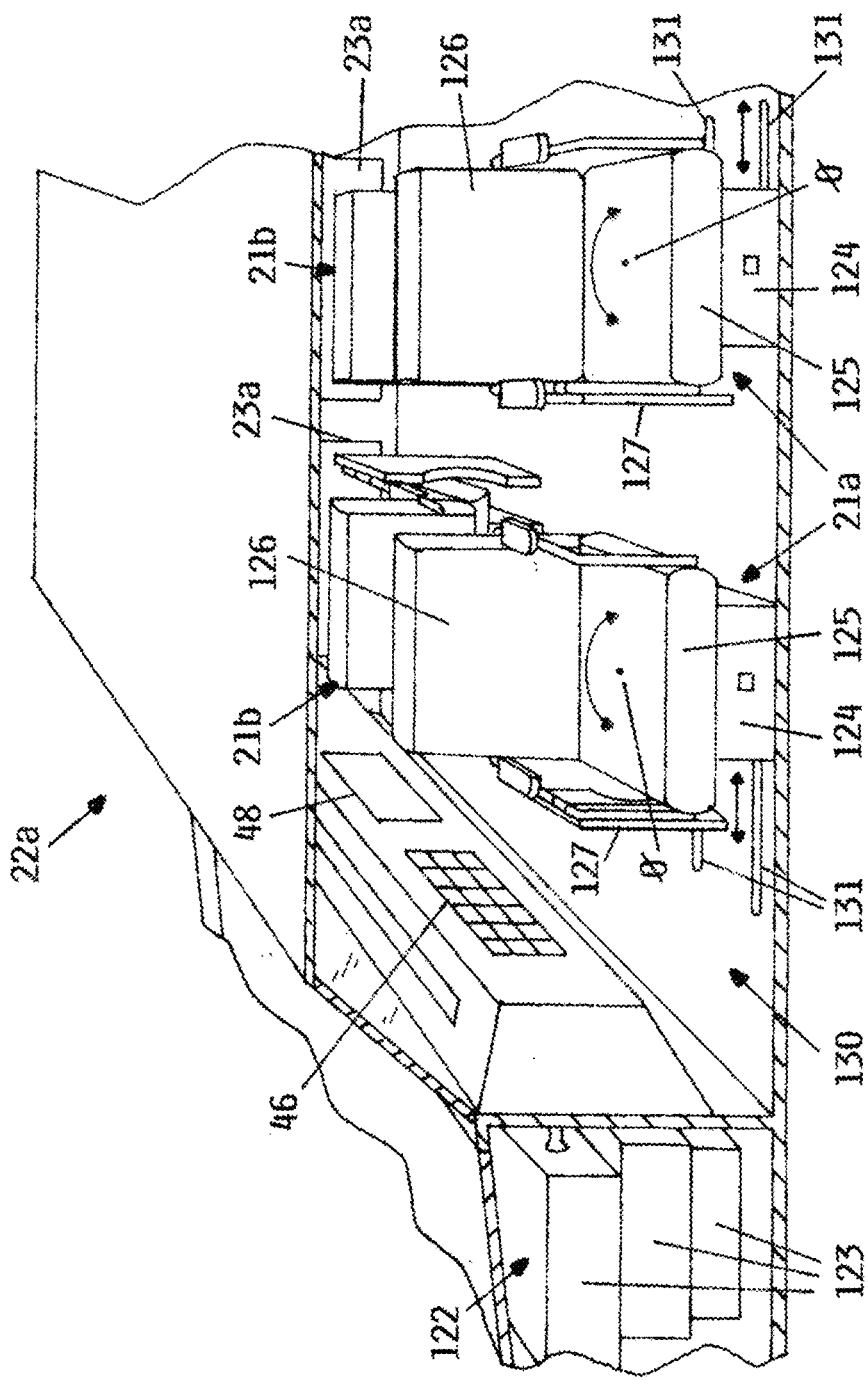
FIG. 18B is a partially broken away perspective view of the passenger module with the two chairs on the left side of the passenger module facing the left side of the passenger module.

FIG. 18B illustrates the interior of passenger module 22a. The doors 23a travel along track 152 when moving between the open and closed configurations. The interior module 130 consists of chairs 21a, 21b, informational displays 46 and breathing systems 48. Also shown is storage compartment 122 and cargo 123.

Chairs 21a consist of a pedestal 124, seat 125, back rest 126, and desk/tray 127. The seat and back rest rotate together, independently from the pedestal. Rotation of the seat and back rest occur together around axis 1. The pedestal, seat, and backrest can also move together, along tracks 131.

Figure 18C:
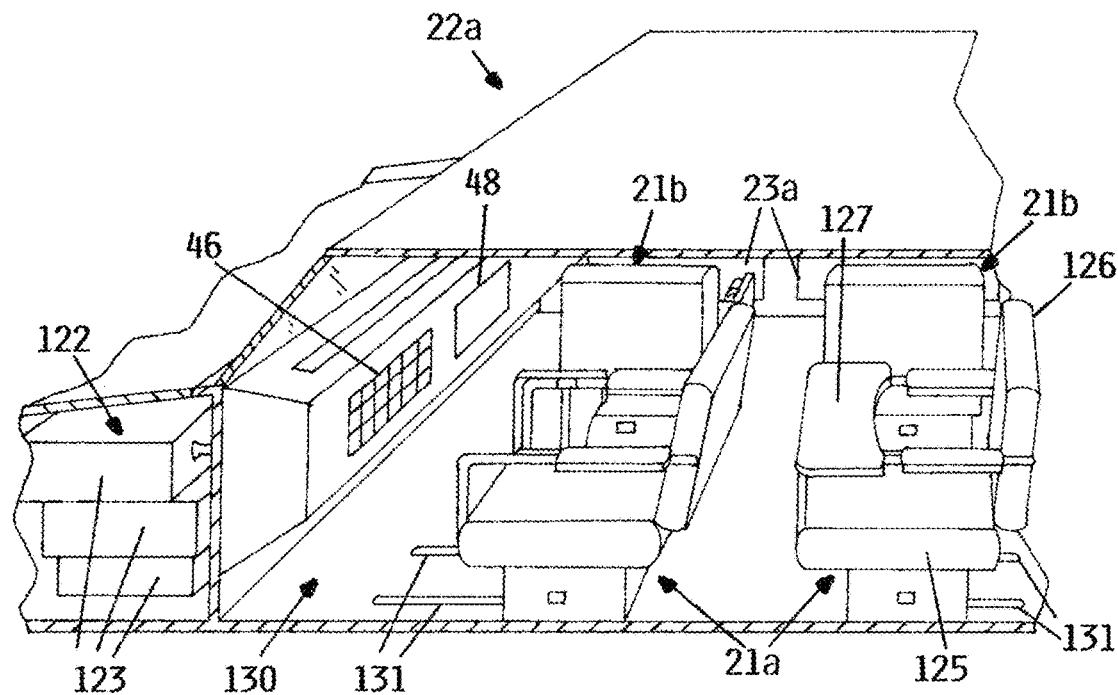
FIG. 18C is a partially broken away perspective view of the passenger module with the two chairs on the left side of the passenger module facing the front of the passenger module.
Figure 18D:
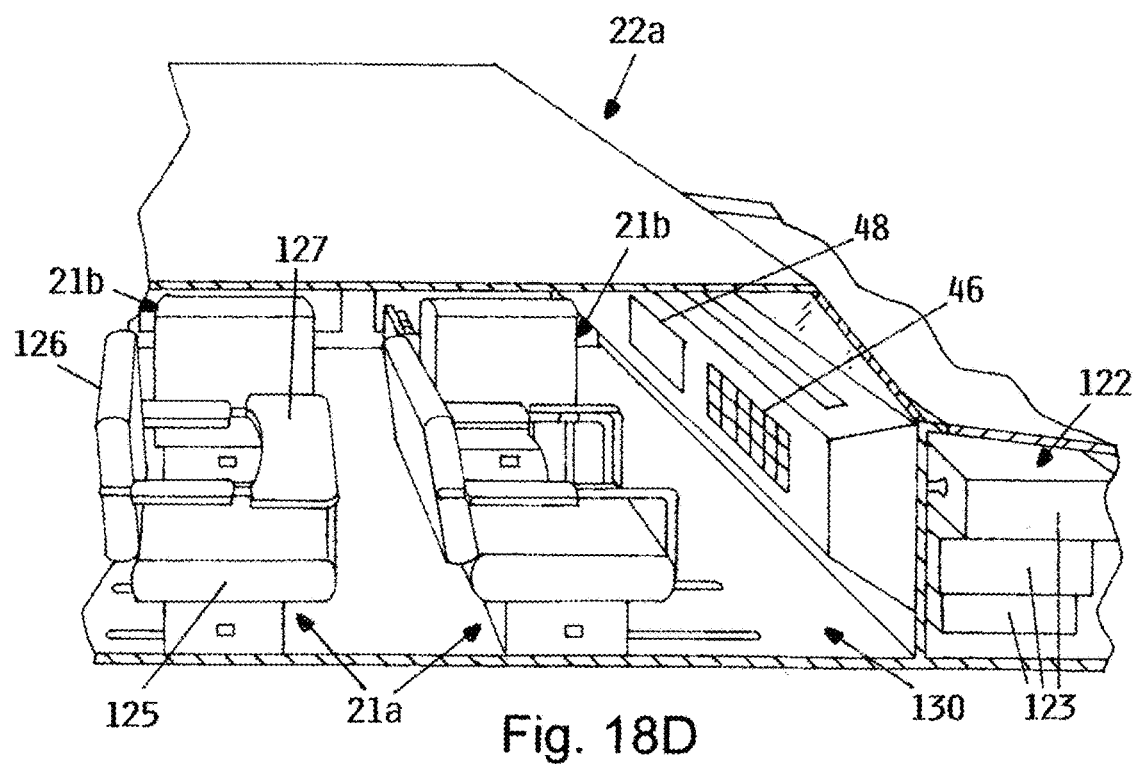
FIG. 18D is a partially broken away perspective view of the passenger module with the two chairs on the right side of the passenger module facing the front of the passenger module.
Figure 18E:
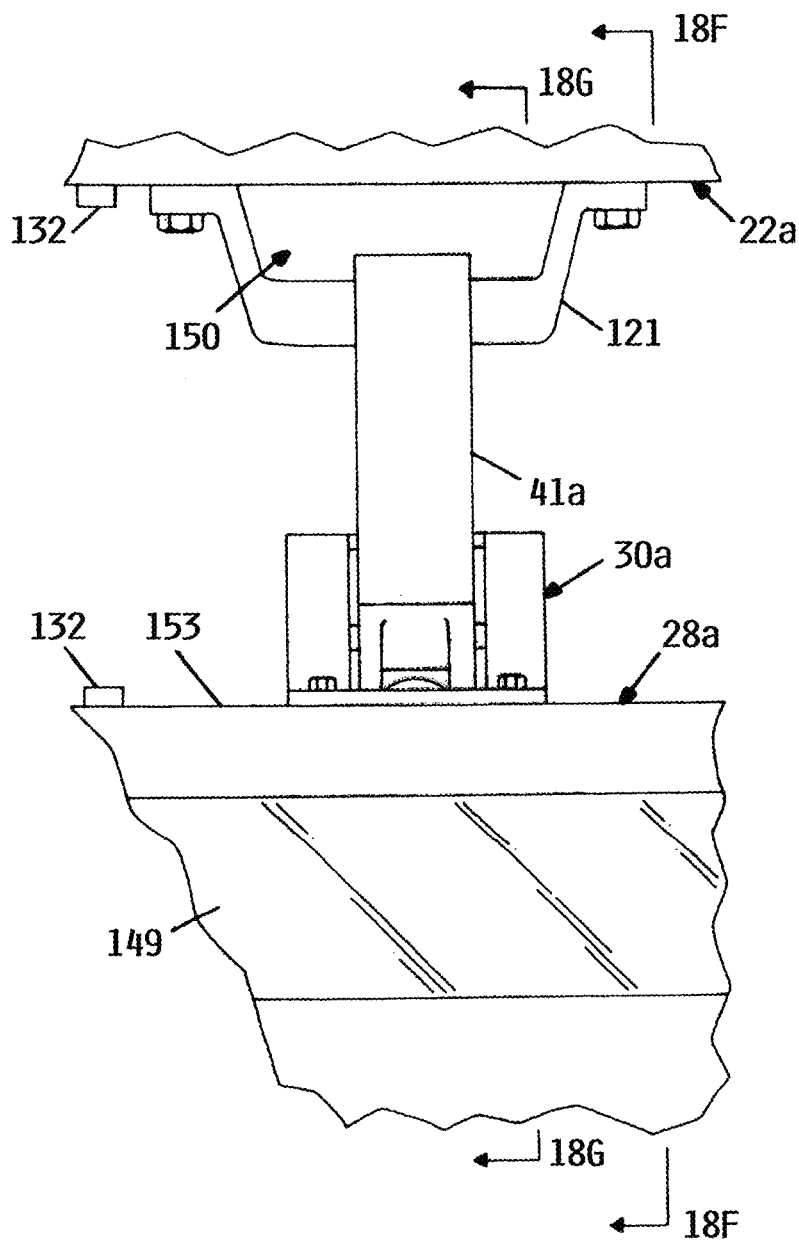
FIG. 18E is a cross-section view of a clamping mechanism for the passenger module.

FIG. 18C shows two of the four chairs 21a, 21b orientated at 9:00 o'clock while FIG. 18D shows the chairs 21a at 3:00 o'clock. It is important that the seat 125 and back rest 126 have this 180° range of motion. When the doors 23a can be safely opened, rotation of a seated person is accomplished. The orientation of this motion is from 9:00 o'clock to 3:00 o'clock for the seat and back rest of chairs 21a and from 3:00 o'clock to 9:00 o'clock for the seat and back rest of chairs 21b. This range of motion improves interaction between individuals. This aspect could also be useful if an electric vehicle is equally powered in the opposite direction.

FIG. 18E is a cross-section view depicting one of the clamping mechanisms 30a, which secures the power wheeled base 28a to the passenger module 22a.

FIG. 18F is a cross-section view showing the outside of clamping mechanism 30a. This view illustrates clamping mechanism cover 133, left sidewalls 157l, 158l, supporting structure 137, and surface 153 of the power wheeled base 28a.

Figure 18G:
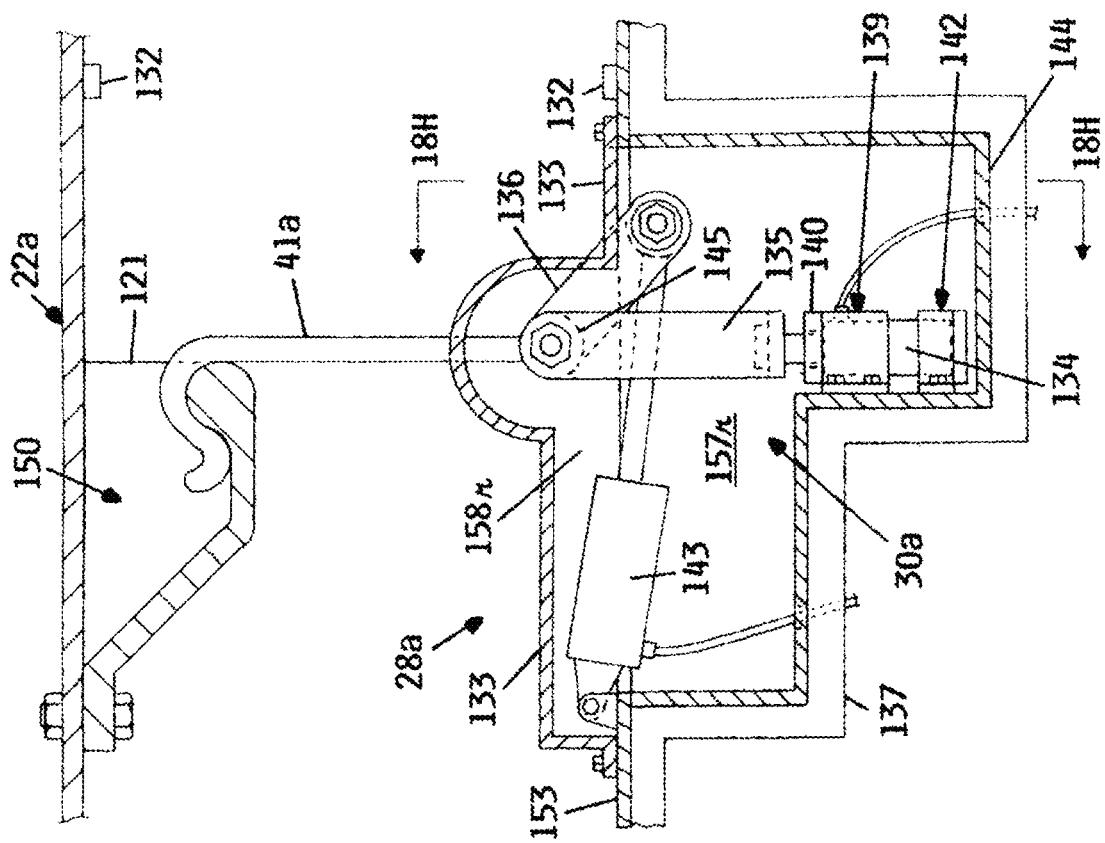
FIG. 18G is a cross-section view of an interior of the clamping mechanism.
Figure 18F:
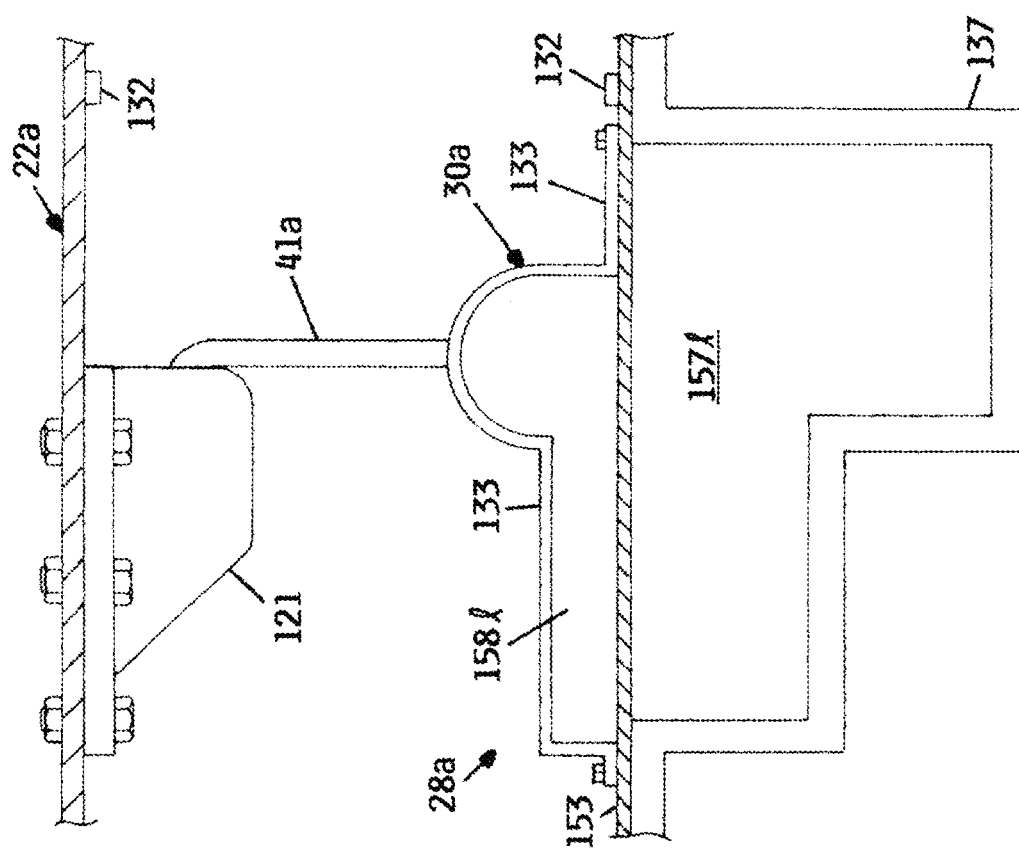
FIG. 18F is a cross-section view of the outside of the clamping mechanism.

FIG. 18G is a cross-section view showing the clamping method of the power wheeled base 28a to the passenger module 22a. This process is initiated by sensors 132 which then activates power cylinder 143. Power cylinder 143 rotates arm members 136 in an upward direction and rotates clamp 41a into recess 150. When clamp 41a completes its 90° rotation, power cylinder 134 is activated. Power cylinder 134 and u-shaped member 135 function in a downward and upward linear path. It engages and disengages clamp 41a onto clamp receiver 121 of the passenger module 22a. This process is then reversed when transferring the passenger module 22a to the tracks 25 on the airplane floor 63 or another power wheeled base (FIG. 2D).

Figure 18H:
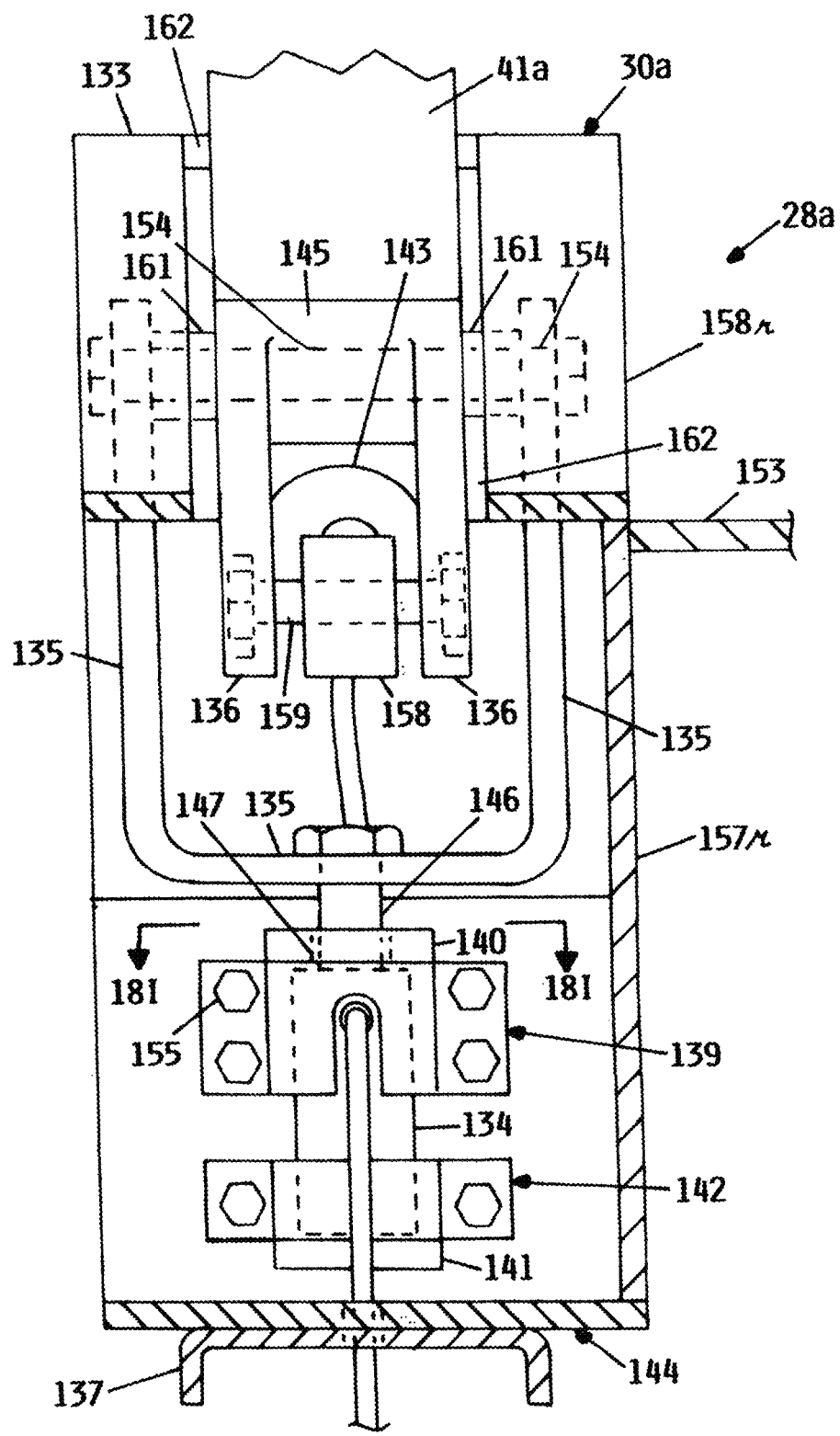
FIG. 18H is another cross-section view of the interior of the clamping mechanism.

FIG. 18H is a cross-section view showing in greater detail clamping mechanism 30a. Clamp 41a is attached to its metal tube 145 which has arm members 136. Arm members 136 and metal eye 158 rotate about shaft 159. Support shaft 154 allows metal tube 145 to rotate and move linearly. Opening 162 in cover 133 allows the rotational and linear passage of clamp 41a along with the rotating arm members 136. Spacers 161 align the metal tube 145 to be within cover opening 162. Also shown in this view is right side walls 157r, 158r, clamp mechanism housing 144, power cylinder bottom holder 142 with bottom cap 141 shown welded on, and top power cylinder holder 139.

Figure 18I:
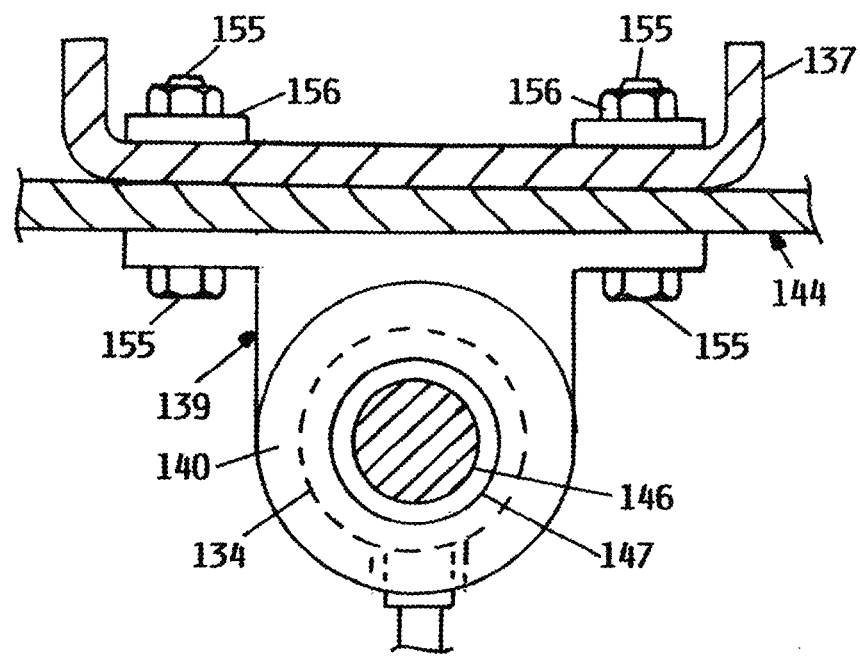
FIG. 18I is another cross-section view of the interior of the clamping mechanism.

FIG. 18I is yet another cross-section of the clamping mechanism. It shows top cap 140 restraining the cylinder body of power cylinder 134. This top cap is shown welded to holder 139. The aperture 147 allows shaft 146 to pass freely through to u-shaped member 135 (FIG. 18H). Power cylinder 134 is anchored to supporting structure 137 by bolts 155 and flanged nuts 156. The flanged nuts are shown welded to the support structure 137.

Figure 18J:
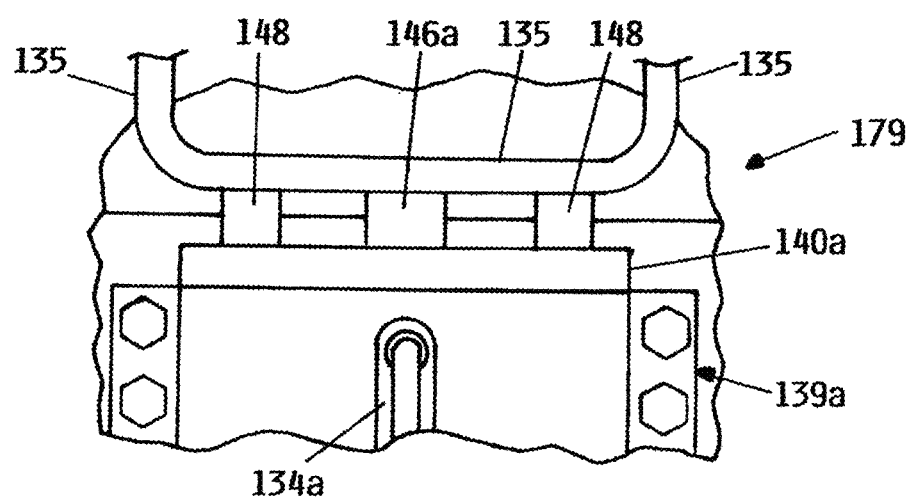
FIG. 18J is an alternative connection mechanism for the passenger module.

FIG. 18J illustrates an alternative connection method 179 between the power cylinder 134a and the u-shaped member 135. This connection includes power rod 146a and guide rods 148. Also shown is cap 140a, which is shown welded to top cylinder holder 139a.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An airplane passenger transport system comprising:
   a first passenger module, wherein the first passenger module is adapted to transport at least one person in an at least partially enclosed configuration and wherein the first passenger module comprises at least one of a seat and a bed for the at least one person can sit while being transported in the airplane;
   a base module comprising a base module rail and a first engagement mechanism, wherein the first passenger module is positionable on the base module rail; and
   an airplane comprising an airplane rail and a second engagement mechanism, wherein the first engagement mechanism is capable of engaging the second engagement mechanism to retain the base module in a stationary position with respect to the airplane so that the first passenger module can move from the base module rail to the airplane rail and wherein when the first passenger module is on the airplane rail, the first passenger module can be transported in the airplane, wherein the base module and the airplane each comprise a gear track and wherein the first passenger module further comprises:
   a first wheel assembly having at least one first wheel, wherein the first wheel assembly is pivotally attached to the first passenger module and wherein the at least one first wheel engages the base module rail or the airplane rail;
   a first gear powered drive having a plurality of teeth extending therefrom, wherein the first gear powered drive is mounted to the first passenger module proximate the first wheel assembly;
   a second wheel assembly having at least one second wheel, wherein the second wheel assembly is pivotally attached to the first passenger module and wherein the at least one second wheel engages the base module rail or the airplane rail; and
   a second gear powered drive having a plurality of teeth extending therefrom, wherein the second gear powered drive is mounted to the first passenger module proximate the second wheel assembly, wherein the plurality of teeth on the first gear powered drive and the second gear powered drive engage the gear rack on the base module or the airplane to cause the first passenger module to move with respect to the base module or the airplane and wherein the first wheel assembly and the second wheel assembly pivot with respect to the first passenger module to travel in a linear path that is the same as the associated gear powered drive as the passenger module moves between the base module rail and the airplane rail.

2. The airplane passenger transport system of claim 1, and further comprising:
a second passenger module that is removably positionable in the airplane, wherein the second passenger module is adapted to transport at least one person in an at least partially enclosed configuration and wherein the second passenger module comprises at least one of a seat and a bed for the at least one person can sit while being transported in the airplane.

3. The airplane passenger transport system of claim 1, wherein the first passenger module is substantially enclosed comprising a floor, a ceiling, a side wall that extends between the floor and the ceiling and an opening formed through which the at least one person can move into and out of the first passenger module.

4. The airplane passenger transport system of claim 3, wherein the first passenger module further comprises a door that is capable of at least partially covering the opening.

5. The airplane passenger transport system of claim 1, wherein the at least one first wheel comprises at least one running wheel and at least one guide wheel.

6. The airplane passenger transport system of claim 1, and further comprises a clamp that is capable of retaining the first passenger module in a substantially stationary position in the airplane.

7. The airplane passenger transport system of claim 6, and further comprising a sensor that causes the clamp to engage the first passenger module when the first passenger module is at a designated location in the airplane.

8. The airplane passenger transport system of claim 6, wherein the clamp is pivotable and slidable when engaging the first passenger module.

9. The airplane passenger transport system of claim 1, wherein the first passenger module comprises:
a storage compartment;
a breathing system that may be used by the at least one person to breath; and
an informational display that is capable of providing at least one of flight information and entertainment to the at least one person while the at least person is transported in the first passenger module.

10. The airplane passenger transport system of claim 1, wherein the base module is capable of moving the first passenger module from a location at which the person is positioned in the first passenger module to the airplane.

11. A method of reducing time for passengers to board an airplane as compared to the passengers individually boarding the airplane, wherein the method comprises:
providing a first passenger module, wherein the first passenger module comprises at least one of a seat and a bed for the at least one person can sit;
providing a base module comprising a base module rail and a first engagement mechanism;
providing an airplane comprising an airplane rail and a second engagement mechanism, wherein the base module and the airplane each comprise a gear track and wherein the first passenger module further comprises:
a first wheel assembly having at least one first wheel, wherein the first wheel assembly is pivotally attached to the first passenger module and wherein the at least one first wheel engages the base module rail or the airplane rail;
a first gear powered drive having a plurality of teeth extending therefrom, wherein the first gear powered drive is mounted to the first passenger module proximate the first wheel assembly;
a second wheel assembly having at least one second wheel, wherein the second wheel assembly is pivotally attached to the first passenger module and wherein the at least one second wheel engages the base module rail or the airplane rail;
a second gear powered drive having a plurality of teeth extending therefrom, wherein the second gear powered drive is mounted to the first passenger module proximate the second wheel assembly;
positioning the first passenger module on the base module rail;
positioning at least one person at least partially inside the first passenger module;
moving the base module so that the base module rail is proximate the airplane rail;
engaging the first engagement mechanism and the second engagement mechanism to retain the base module in a stationary position with respect to the airplane;
moving the first passenger module from the base module rail to the airplane rail, which comprises:
engaging the plurality of teeth on the first gear powered drive and the second gear powered drive with the gear rack on the base module or the airplane to cause the first passenger module to move with respect to the base module or the airplane; and
pivoting the first wheel assembly and the second wheel assembly with respect to the first passenger module to travel in a linear path that is the same as the associated gear powered drive as the passenger module moves between the base module rail and the airplane rail; and
flying the airplane to a different location than a location at which the at least one person was positioned at least partially inside the first passenger module.

12. The airplane passenger transport system of claim 1, wherein the first engagement mechanism comprises a tension release clamp and wherein the second engagement mechanism comprises a receiving post.

13. The airplane passenger transport system of claim 1, wherein the base module further comprises a first docking mechanism, wherein the airplane further comprises a second docking mechanism and wherein the second docking mechanism extends into the first docking mechanism to retain the base module rail in alignment with the airplane rail when the first passenger module is moved from the base module rail to the airplane rail.

14. The airplane passenger transport system of claim 13, wherein the first docking mechanism comprises a recess and wherein the second docking mechanism comprises an extension.

15. The airplane passenger transport system of claim 1, and further comprising an alignment sensor that ensures the base module rail is in alignment with the airplane rail before the first passenger module is moved from the base module rail to the airplane rail.

16. The airplane passenger transport system of claim 1, wherein the base module comprises:
at least wheel on which the base module is movable; and
a motor that enables the base module to move.

17. The method of claim 11, wherein the first engagement mechanism comprises a tension release clamp, wherein the second engagement mechanism comprises a receiving post and wherein engaging the first engagement mechanism and the second engagement mechanism comprises positioning the receiving post in the tension release clamp.

18. The method of claim 11, wherein the base module further comprises a first docking mechanism, wherein the airplane further comprises a second docking mechanism and wherein the method further comprises extending the second docking mechanism into the first docking mechanism to retain the base module rail in alignment with the airplane rail when the first passenger module is moved from the base module rail to the airplane rail.

19. The method of claim 18, wherein the first docking mechanism comprises a recess and wherein the second docking mechanism comprises an extension.

20. The method of claim 11, and further comprising utilizing an alignment sensor to ensure the base module rail is in alignment with the airplane rail before the first passenger module is moved from the base module rail to the airplane rail.

21. The method of claim 11, wherein the base module further comprises at least one first wheel and a motor and wherein the method further comprises using the motor to move the base module on the at least on wheel.

* * * * *